United States Patent
Manabe et al.

(10) Patent No.: US 6,753,046 B2
(45) Date of Patent: Jun. 22, 2004

(54) LIQUID CRYSTALLINE COMPOUND, MEDIUM AND DISPLAY

(75) Inventors: Atsutaka Manabe, Bensheim (DE); Matthias Bremer, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 44 days.

(21) Appl. No.: 10/289,303

(22) Filed: Nov. 7, 2002

(65) Prior Publication Data
US 2003/0190436 A1 Oct. 9, 2003

(30) Foreign Application Priority Data
Nov. 7, 2001 (EP) ............................................. 01126409

(51) Int. Cl.$^7$ ..................... C09K 19/30; C09K 19/12; C07C 25/13; C07C 22/08
(52) U.S. Cl. .............. 428/1.1; 252/299.63; 252/299.66; 252/299.5; 570/127; 570/129; 570/130
(58) Field of Search ........................ 252/299.63, 299.66; 428/1.1; 570/127, 128, 130

(56) References Cited

U.S. PATENT DOCUMENTS

| | | | |
|---|---|---|---|
| 6,565,933 B2 * | 5/2003 | Tarumi et al. | ............... 428/1.1 |
| 6,596,350 B2 * | 7/2003 | Tarumi et al. | ............... 428/1.1 |
| 6,669,998 B2 * | 12/2003 | Tarumi et al. | ............... 428/1.1 |
| 2002/0060311 A1 | 5/2002 | Tarumi et al. | |
| 2002/0061368 A1 | 5/2002 | Tarumi et al. | |
| 2002/0093004 A1 | 7/2002 | Tarumi et al. | |

FOREIGN PATENT DOCUMENTS

| | | |
|---|---|---|
| EP | 0 439 089 A1 | 7/1991 |
| WO | WO 01.12751 A1 | 2/2001 |

* cited by examiner

*Primary Examiner*—Shean C. Wu
(74) *Attorney, Agent, or Firm*—Millen, White, Zelano & Branigan, P.C.

(57) ABSTRACT

The invention relates to a liquid crystalline compound of the formula I

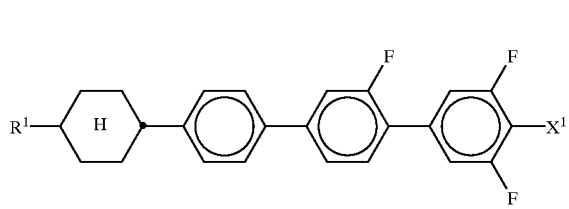

wherein $X^1$ and $R^1$ are defined as in claim 1. The invention further relates to a liquid crystalline medium based on a mixture of polar compounds of positive dielectric anisotropy containing one or more compounds of formula I and its use in electrooptical displays and projection systems, in particular reflective displays and displays based on a birefringence effect, such as OCB displays.

18 Claims, No Drawings

LIQUID CRYSTALLINE COMPOUND, MEDIUM AND DISPLAY

The invention relates to a liquid crystalline compound, especially suitable as a component of a liquid crystalline medium with positive dielectric anisotropy and high optical anisotropy. Furthermore, the invention also relates to such a liquid crystalline medium and its use in electrooptical displays and projection systems, in particular reflective displays, LCoS™ displays and displays based on a birefringence effect, such as OCB displays.

Displays of the OCB (optically compensated bend) are based on a birefringence effect and comprise a liquid crystal layer with a bend structure. The bend cell, also known as pi-cell, was first proposed by P. Bos et al., SID 83 Digest, 30 (1983) for an electrically controllable half-wave plate, whereas the OCB mode for displays was described by Y. Yamaguchi, T. Miyashita and T. Uchida, SID 93 Digest, 277 (1993), followed by papers of T. Miyashita et al. in, inter alia, Proc. Eurodisplay, 149 (1993), J. Appl. Phys. 34, L177 (1995), SID 95 Digest, 797 (1995), and C. -L. Kuo et al., SID 94 Digest, 927 (1994). An OCB cell comprises a liquid crystal cell with bend alignment and a liquid crystal medium with positive $\Delta\epsilon$. Furthermore, OCB displays as reported in the above papers comprise one or more birefringent optical retardation films to eliminate light leakage by the bend cell in the black state. OCB displays bear several advantages like for example a wider viewing angle and shorter switching times than conventional displays based on twisted nematic (TN) cells.

The above mentioned papers have shown that liquid-crystalline phases must have high values for the optical anisotropy $\Delta n$ and a relatively high positive value for the dielectric anisotropy $\Delta\epsilon$, and preferably should have rather low values for the ratio between the elastic constants $K_{33}/K_{11}$ and for the viscosity, in order to be usable for high-information display elements based on the OCB effect. The industrial application of the OCB effect in electro-optical display elements requires LC phases which must satisfy a multiplicity of requirements. Particularly important here are chemical resistance to moisture, air and physical effects such as heat, radiation in the infra-red, visible and ultra-violet regions and direct and alternating electrical fields. Furthermore, LC phases which can be used industrially need a liquid-crystalline mesophase in a suitable temperature range, a relatively high birefringence, a positive dielectric anisotropy and a low viscosity.

LCoS™ (Liquid Crystal on Silicon) displays are known in prior art and are available from Three-Five Systems Inc. (Tempe, Ariz., USA). LCoS™ microdisplays are reflective displays that typically comprise a liquid crystal layer with twisted nematic structure sandwiched by a silicon backplane and a cover glass. The silicon backplane is an array of pixels, each of which has a mirrored surface which is at the same time a conductor. Each pixel comprises a stationary mirror covered by an active liquid crystal layer with twisted nematic orientation that can be switched into homeotropic orientation by application of a voltage. LCoS™ microdisplays are small with a diagonal of typically less than 1.0", however, they enable high resolution from ¼ VGA (78 thousand pixels) to UXGA+ (over 2 million pixels).

Due to the small pixel size LCoS™ displays also have a very thin cell thickness, which is typically about 1 micron. Therefore, liquid-crystalline phases used in these displays must in particular have high values for the optical anisotropy $\Delta n$, in contrast to conventional reflective type LC displays, which usually require LC phases with low $\Delta n$. At the same time, high reliability against UV light is essential due to the backlight system of LCoS™ displays and projection displays in general.

None of the series of compounds having a liquid-crystalline mesophase which have been disclosed hitherto includes a single compound which meets all these requirements. Generally, therefore, mixtures of from two to 25, preferably from three to 18, compounds are prepared to give substances which can be used as LC phases. However, ideal phases cannot easily be produced in this way, since liquid-crystal materials having at the same time high birefringence and low viscosity were hitherto not available.

OCB mode and LCoS™ displays can be operated as matrix displays. Matrix liquid-crystal displays (MLC displays) are known. Examples of nonlinear elements which can be used to individually switch the individual pixels are active elements (i.e. transistors). This is then referred to as an "active matrix", and a differentiation can be made between two types:

1. MOS (metal oxide semiconductor) transistors on silicon wafers as substrate,
2. Thin-film transistors (TFT) on a glass plate as substrate.

In the case of type 1, the electro-optical effect used is usually dynamic scattering or the guest-host effect. The use of monocrystalline silicon as substrate material restricts the display size, since even the modular assembly of various part-displays results in problems at the joints.

In the case of the more promising type 2, which is preferred, the electro-optical effect used is usually the TN effect. A distinction is made between two technologies: TFTs comprising compound semi-conductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counterelectrode. Compared with the size of the pixel electrode, the TFT is very small and has virtually no adverse effect on the image. This technology can also be extended to fully colour-compatible image displays, in which a mosaic of red, green and blue filters is arranged in such a manner that each filter element is located opposite a switchable pixel.

The TFT displays disclosed hitherto usually operate as TN cells with crossed polarizers in transmitted light and are illuminated from the back. In case of OCB mode displays, however, reflective displays have also been proposed by T. Uchida, T. Ishinabe and M. Suzuki in SID 96 Digest, 618 (1996).

The term MLC display here covers any matrix display containing integrated nonlinear elements, i.e. in addition to the active matrix, also displays containing passive elements such as varistors or diodes (MIM=metal-insulator-metal).

MLC displays of this type are particularly suitable for TV applications or for high-information displays in automobile or aircraft construction. In addition to problems with respect to the angle dependence of the contrast and the response times, difficulties occur in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. As the resistivity decreases, the contrast of an MLC display worsens. Since the resistivity of the liquid-crystal mixture generally decreases over the life of an MLC display due to interaction with the internal surfaces of the display, a high (initial) resistance is very important for displays which must have acceptable resistance values over a long operating period. Furthermore MLC displays, especially for outdoor use, are exposed to UV-radiation by the sunlight, a situation similar to the influence of the backlight in projection and LCoS™ displays. Compounds of the liquid crystalline medium, especially tolane derivatives, which are used to achieve a high optical anisotropy, may decompose under intensive UV radiation, also leading to a decrease of the resistivity of the medium.

The disadvantage of the MLC-TN displays disclosed hitherto is due to their comparatively low contrast, the relatively high viewing angle dependence and the difficulty of producing grey shades in these displays.

Thus, there continues to be a great demand for MLC displays, in particular projection displays, displays based on a birefringence effect, such as OCB displays, and TFT-displays for outdoor use having very high resistivity at the same time as a wide operating temperature range, short response times and low threshold voltage, with the aid of which various grey shades can be produced. Furthermore, there is a great demand for liquid crystalline media for these kind of displays which exhibit at the same time low viscosities, high birefringence, relatively high positive dielectric anisotropy and a high UV stability.

The invention thus provides a highly polar compound which exhibits a high optical anisotropy, a very high clearing point und UV stability and which is therefore especially suitable as a component of liquid crystalline media in MLC displays.

The invention further provides a liquid crystalline medium, which overcomes the above mentioned disadvantages, at least in part, and at the same time has a high optical and dielectrical anisotropy, a high clearing temperature and shows a good UV stability.

Furthermore, the invention provides an electrooptical liquid crystal display, in particular an active matrix display, a reflective display and a display of a projection, LCoS™ or OCB mode, which do not have the above mentioned disadvantages, or do so only to a reduced extent.

The invention moreover provides cholesteric liquid crystal media with a high optical anisotropy and with a good UV stability and a cholesteric liquid crystal display.

Thus, the invention provides a liquid crystalline compound of the formula I

I wherein
X$^1$ is OCF$_3$ and
R$^1$ is alkyl with 1 to 20 C atoms.
The compounds of the formula I exhibit
a high value of the birefringence,
a very high positive dielectric anisotropy,
a very high clearing point,
a low rotational viscosity,
a good low temperature stability and
a high UV stability.

Furthermore, the invention provides a liquid-crystalline medium based on a mixture of polar compounds of positive dielectric anisotropy containing one or more, i.e., at least one, compound of formula I.

The liquid crystalline medium according to the present invention is characterized in that it exhibits
a high value of the birefringence,
a high positive dielectric anisotropy,
a broad nematic phase range, especially a high clearing temperature,
a low viscosity, and
a high UV stability.

Therefore, the inventive liquid crystalline medium is especially suited for electrooptical displays for outdoor usage allowing high UV radiation and a broad working temperature range, especially up to high temperatures. Furthermore, electrooptical liquid crystal displays with a strong illumination light, like projection displays, e.g. of the LCoS™ mode, may benefit from the use of the liquid crystalline medium according to the invention, by a longer lifetime due to the high UV stability. In addition when using the inventive liquid crystal medium in an electrooptical display it is possible to achieve small values of the response time, a low driving voltage, a satisfying grey scale performance, a wide viewing angle and a high contrast.

Cholesteric liquid crystal media comprising as a nematic component a liquid crystal medium according to the present invention and as optically active component one or more chiral dopants are also provided by the present invention. The above mentioned advantageous properties of the inventive liquid crystalline medium, especially the high optical birefringence and good UV stability, are also advantageous for cholesteric applications. The invention thus also provides cholesteric liquid crystal displays, in particular SSCT- and PSCT-displays, comprising a cholesteric liquid crystal medium as described above.

The invention thus relates to a liquid crystalline compound of the formula I as defined above and below.

Furthermore the invention relates to a liquid-crystalline medium based on a mixture of polar compounds having positive dielectric anisotropy, characterized in that it contains one or more compounds of formula I as defined above and below.

According to the DE 199 19 348 A1, EP 0 439 089 A1 and WO 01/12751 the generic formula I*

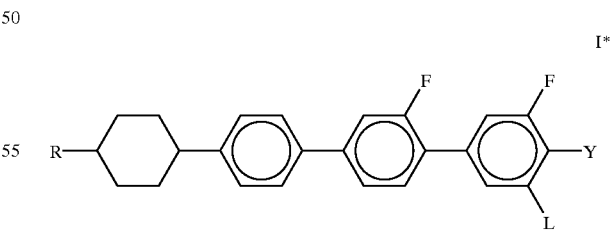

I* wherein R is H, an alkyl or alkenyl radical having 1 to 15 C-atoms which may substituted and wherein one or more CH$_2$ groups may be replaced by various groups, L is H or F and Y is F, Cl, halogenated alkyl, alkenyl, alkenyloxy, alkoxyalkyl or alkoxy, is known and compounds of this formula I* are proposed as co-components of liquid crystalline mixtures. But compounds of the formula I according to this invention are not disclosed.

Furthermore, the JP 09-030996 describes fluorinated p-terphenyl derivatives.

In the following preferred derivatives of the compound of the formula I which are also preferred components of the liquid crystalline medium according to the invention are given. Thus, a preferred liquid crystalline medium according to the invention contains one or more of the preferred compounds of the formula I as specified below.

Preferred compounds of formula I are those wherein $R^1$ is alkyl with 1 to 8 C atoms. Very preferably $R^1$ is a straight chain alkyl radical and thus $R^1$ is methyl, ethyl, propyl, butyl, pentyl, hexyl, heptyl or octyl, in particular ethyl, propyl or butyl.

Compounds of the formulae Ia and/or Ib are very preferred:

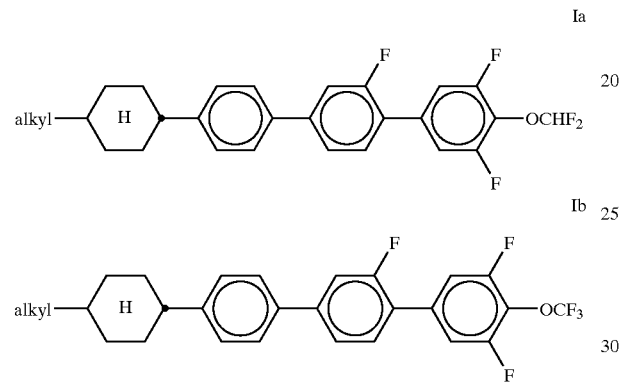

wherein alkyl is an alkyl group with 1 to 8 C atoms.

The compounds of the formula I are prepared using methods known to the person skilled in the art. The following reaction scheme illustrates an advantageous synthesis of the inventive compounds.

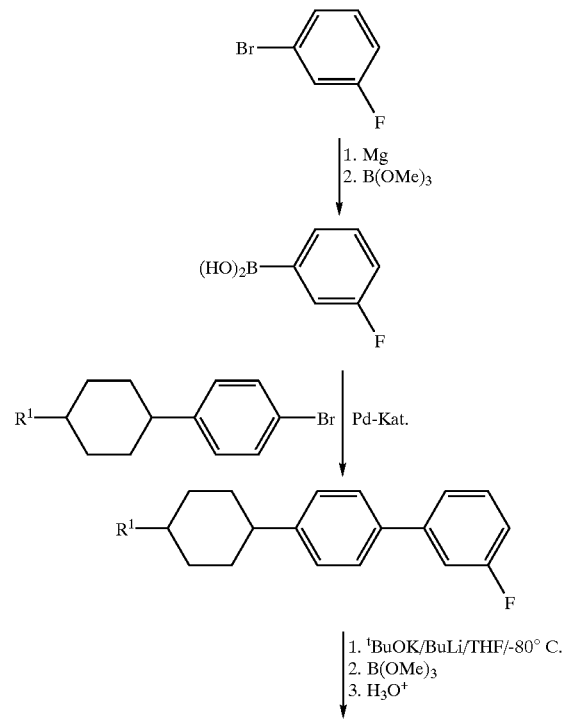

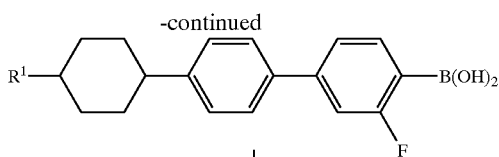

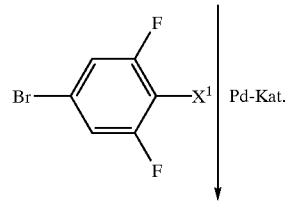

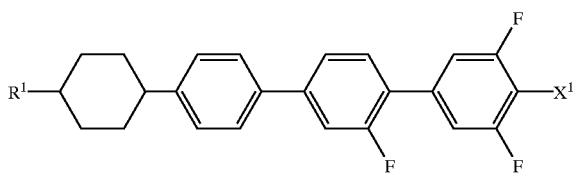

In the following preferred liquid crystalline mixtures according to the invention are specified.

Liquid crystalline mixtures with a high optical anisotropy value $\Delta n \geq 0.16$, especially $\Delta n \geq 0.17$, in particular $\Delta n \geq 0.18$ are preferred. Even optical anisotropy values of $\Delta n \geq 0.19$ can be achieved with inventive mixtures.

The liquid crystalline medium preferably in addition comprises one or more terphenyl compounds of formula IIa

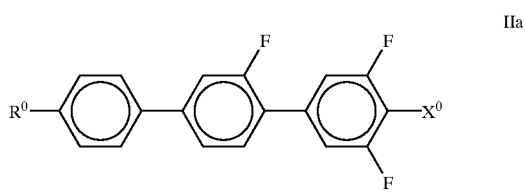

wherein
  $R^0$ is alkyl, alkoxy, fluoroalkyl, up to perfluoroalkyl, alkenyl or oxaalkenyl with up to 9 C atoms and
  $X^0$ is F, Cl, $CF_3$, $OCF_3$, $OCHF_2$, fluoroalkyl or fluoroalkoxy up to perfluoroalkyl or alkoxy, with up to 7 carbon atoms.
  $R^0$ is preferably an alkyl group with 1 to 8 C-atoms. Preferred meanings of $X^0$ are F, $CF_3$, $OCHF_2$ and $OCF_3$.

Thus, a particularly preferred liquid crystalline medium according to the invention comprises one or more of the derivatives of the formula IIa.1

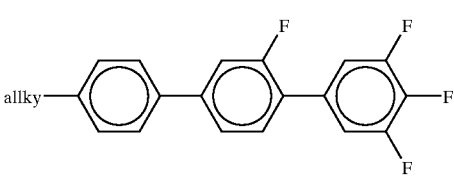

wherein alkyl is an alkyl group with 1 to 8 C-atoms.

Using components of the formula IIa, especially IIa.1, liquid crystal mixtures with a very high dielectrical anisotropy $\Delta\epsilon$, especially $\Delta\epsilon \geq 12.0$, and a very high $\epsilon_\parallel$ value (dielectric constant in the parallel direction to the molecular axis) are obtainable.

In addition the liquid crystalline medium preferably comprises one or more terphenyl compounds of formula IIb

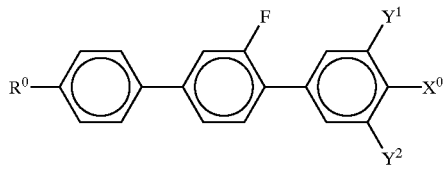

IIb wherein $R^0$ is alkyl, alkoxy, fluoroalkyl, up to perfluoroalkyl, alkenyl or oxaalkenyl with up to 9 C atoms, $X^0$ is F, Cl, $CF_3$, $OCF_3$, $OCHF_2$, fluoroalkyl or fluoroalkoxy up to perfluoroalkyl or alkoxy, with up to 7 carbon atoms, and $Y^1$ and $Y^2$ are each independently of one another H or F.

$R^0$ is preferably an alkyl group with 1 to 8 C-atoms. $X^0$ is very preferably Cl.

Thus, a particularly preferred liquid crystalline medium according to the invention comprises one or more of the derivatives of the formula IIb.1

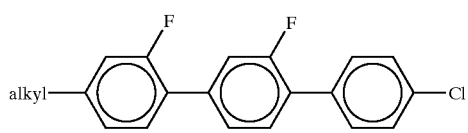

IIb.1 wherein alkyl is an alkyl group with 1 to 8 C-atoms.

Using components of the formula IIb, especially IIb.1, liquid crystal mixtures with a very high optical anisotropy Δn, especially Δn≧0.19, are obtainable.

The liquid crystal mixture preferably comprises in addition one or more polar compounds selected from the formulae III to VIII

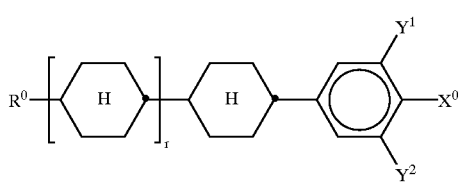

III

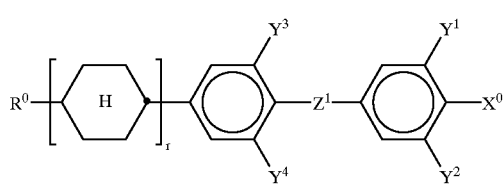

IV

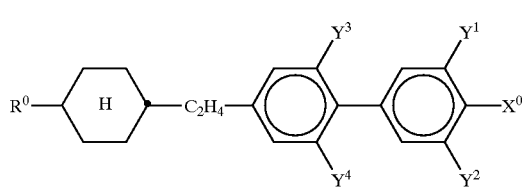

V

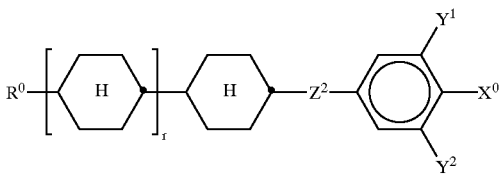

VI

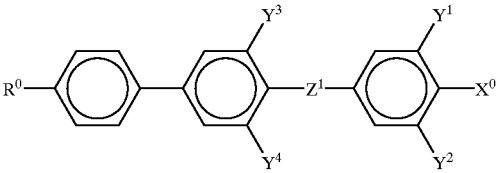

VII

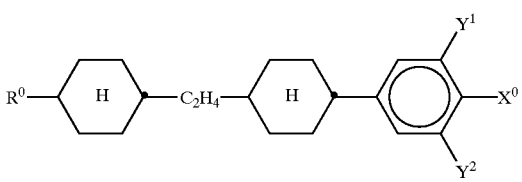

VIII wherein $R^0$ is alkyl, alkoxy, fluoroalkyl up to perfluoroalkyl, alkenyl or oxaalkenyl with up to 9 C atoms, $Z^1$ is $CF_2O$, $C_2F_4$ or a single bond, $Z^2$ is $CF_2O$, $C_2F_4$ or $C_2H_4$, $X^0$ is F, Cl, $CF_3$, $OCF_3$, $OCHF_2$, fluoroalkyl or fluoroalkoxy up to perfluoroalkyl or perfluoroalkoxy, with up to 7 carbon atoms, $Y^1$ to $Y^4$ are independently of each other H or F, and r is 0 or 1.

The compounds of formula III are preferably selected from the following formulae:

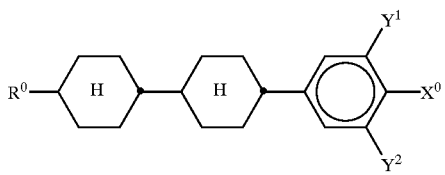

IIIa

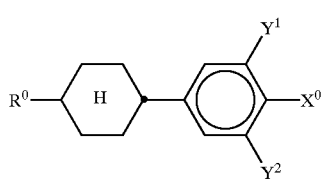

IIIb wherein $R^0$ and $X^0$ have the meanings given above, $R^0$ is preferably n-alkyl with 1 to 8 C atoms or alkenyl with 2 to 7 C atoms and $X^0$ is preferably F, Cl, $CF_3$, $OCF_3$ or $OCHF_2$, in particular F or $OCF_3$.

Particularly preferably the liquid crystal mixture comprises one or more compounds of formula IIIa1

IIIa1

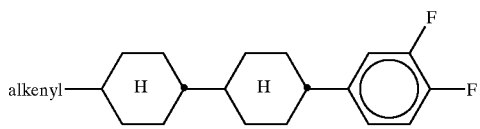

wherein alkenyl is vinyl, 1E-propenyl, 1E-butenyl, 3E-butenyl or 3E-pentenyl, in particular 3E-butenyl or 3E-pentenyl, in particular vinyl.

The compounds of formula IV are preferably selected from the following formulae

IVa

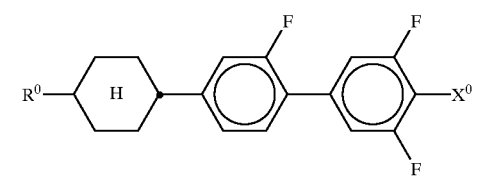

IVb

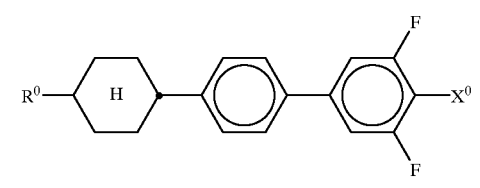

IVc

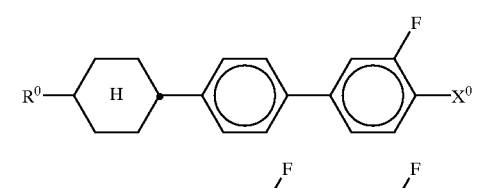

IVd

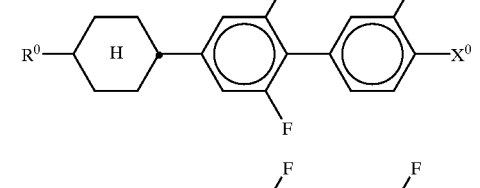

IVe

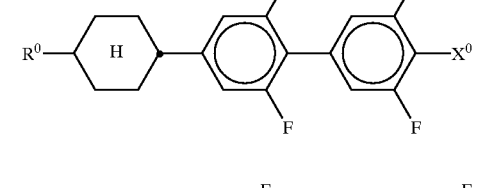

IVf

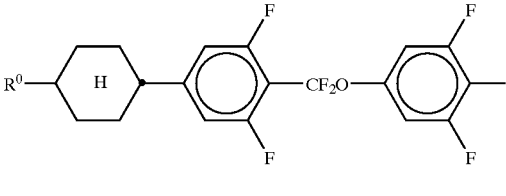

IVg

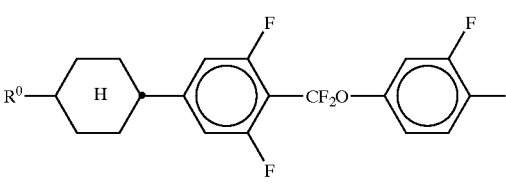

IVh

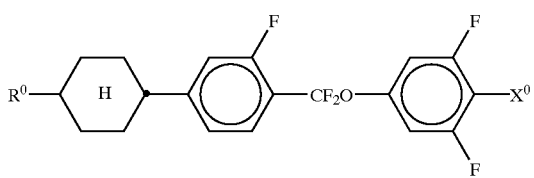

IVi

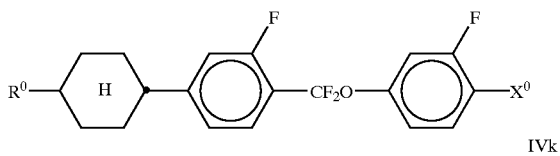

IVk

IVm

IVn

IVo wherein $R^0$ and $X^0$ have the meanings given above, $R^0$ is preferably n-alkyl with 1 to 8 C atoms or alkenyl with 2 to 7 C atoms, and $X^0$ is preferably F, Cl, $CF_3$, $OCF_3$ or $OCHF_2$, in particular F or $OCF_3$.

Particularly preferred are compounds of formula IVa, IVb and IVc, in particular wherein $X^0$ is F. Further, compounds of formula IVf are preferred.

The compounds of formula VI are preferably selected from the following formulae

VIa

-continued

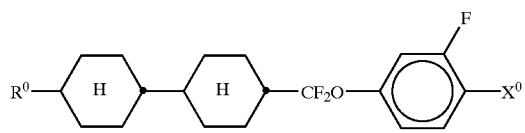
VIb

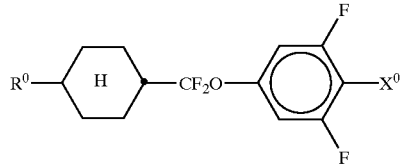
VIc

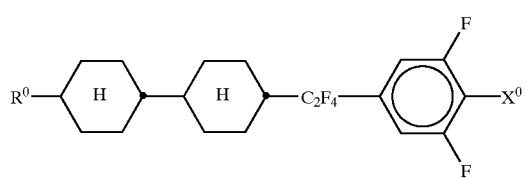
VId

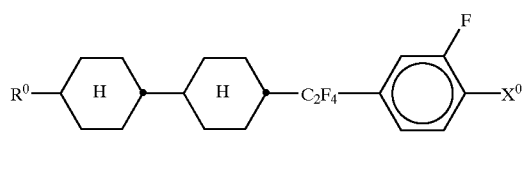
VIe

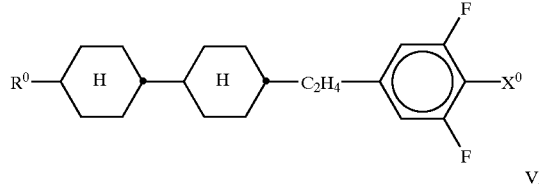
VIf

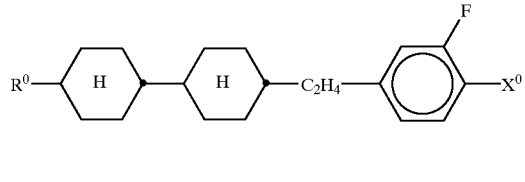
VIg wherein $R^0$ and $X^0$ have the meanings given above, $R^0$ is preferably n-alkyl with 1 to 8 C atoms or alkenyl with 2 to 7 C atoms, and $X^0$ is preferably F, Cl, $CF_3$, $OCF_3$ or $OCHF_2$, in particular F or $OCF_3$.

Particularly preferred are compounds of formula VIa, VIb and VIc.

The compounds of formula VII are preferably selected from the following formulae

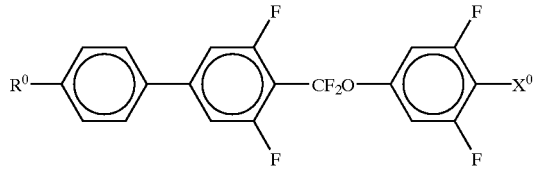
VIIa

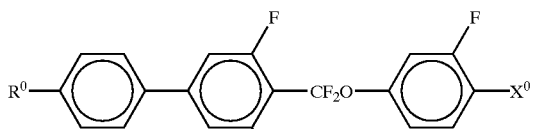
VIIb

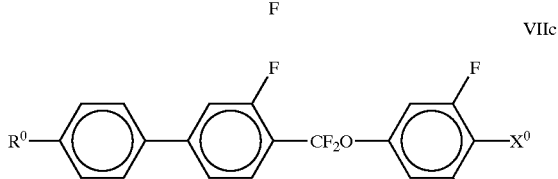
VIIc

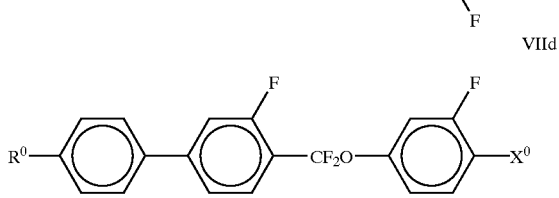
VIId

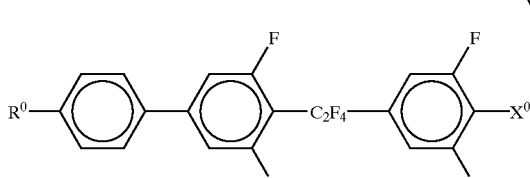
VIIe

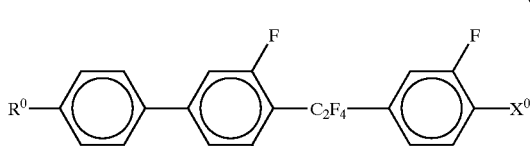
VIIf

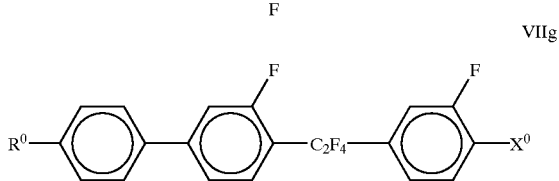
VIIg

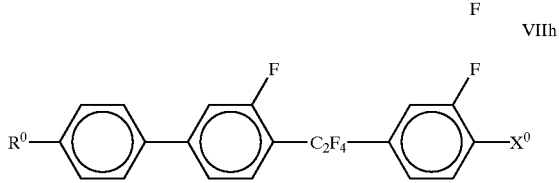
VIIh

VIIi wherein $R^0$ and $X^0$ have the meanings given above, $R^0$ is preferably n-alkyl with 1 to 8 C atoms or alkenyl with 2 to 7 C atoms, and $X^0$ is preferably F, Cl, $CF_3$, $OCF_3$ or $OCHF_2$, in particular F or $OCF_3$.

Particularly preferred are compounds of formula VIIa and VIIb, in particular those wherein $X^0$ is F.-

The liquid crystal mixture preferably comprises in addition one or more four-ring compounds selected from the formulae IX to XVI.

IX
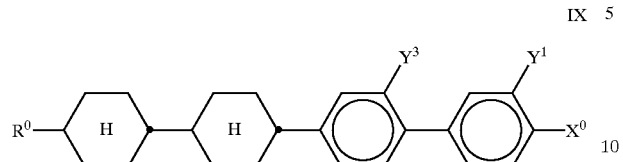

X
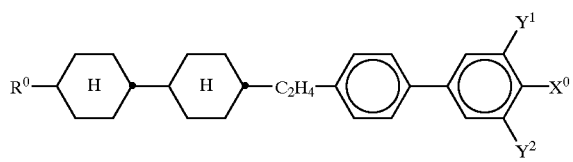

XI
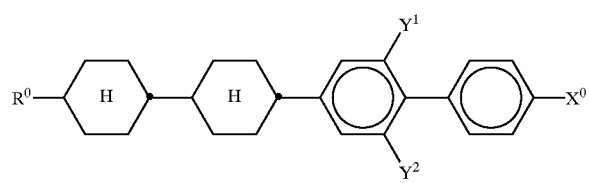

XII
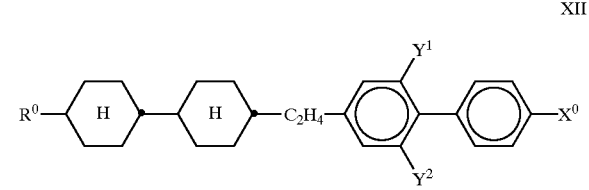

XIII
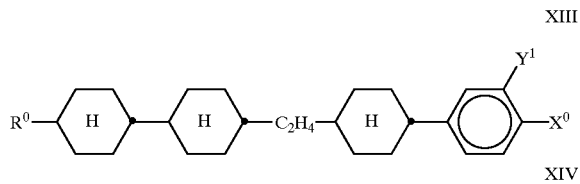

XIV
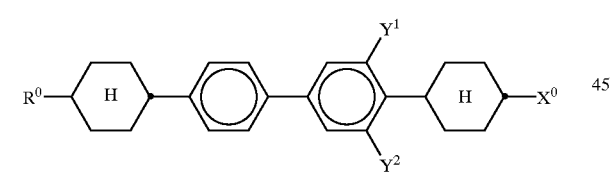

XV
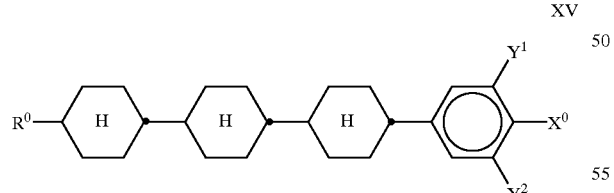

XVI
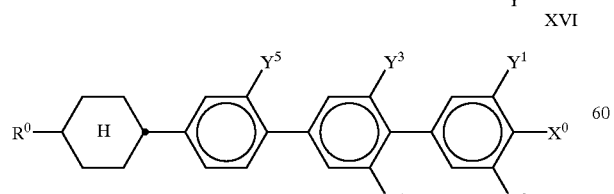

wherein $R^0$ and $X^0$ have the meanings given above and $Y^1$, $Y^2$, $Y^3$, $Y^4$ and $Y^5$ are independently of each other H or F with the proviso that regarding formula XVI $Y^1$, $Y^2$ and $Y^3$ are not F and $Y^4$ and $Y^5$ are not H at the same time. Thus, the formula XVI does not encompass compounds of the formula I. $R^0$ is preferably n-alkyl with 1 to 8 C atoms or alkenyl with 2 to 7 C atoms. $X^0$ is preferably F, Cl, $CF_3$, $OCF_3$ or $OCHF_2$, in particular F or $OCF_3$. $Y^4$ and $Y^5$ are preferably H.

Preferred compounds of the formula IX are those of the formula IXa

IXa
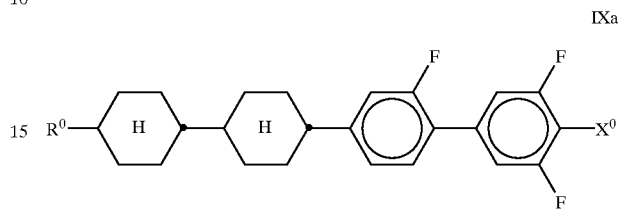

wherein $R^0$ and $X^0$ have the meanings given above. $X^0$ is preferably F, Cl, $CF_3$, $OCF_3$ or $OCHF_2$, in particular F or $OCF_3$.

The liquid crystal mixture preferably comprises in addition one or more compounds selected from the formulae XVII to XIX.

XVII

XVIII
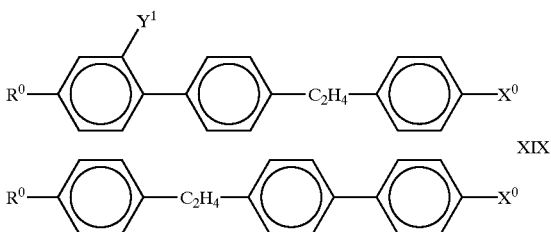

XIX
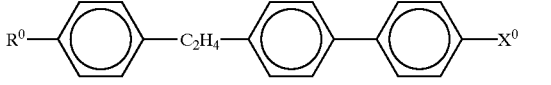

wherein $R^0$, $Y^1$, $Y^2$ and $X^0$ have the meanings given above, and the phenylene rings are optionally mono- or polysubstituted with F or Cl. Preferably $R^0$ is n-alkyl with 1 to 8 C atoms or alkenyl with 2 to 7 C atoms, $X^0$ is F, Cl, $CF_3$, $OCF_3$ or $OCHF_2$, in particular F or Cl, and at least one phenylene ring is substituted with F.

Preferred compounds of formula XVII are those of formula XVIIa

XVIIa
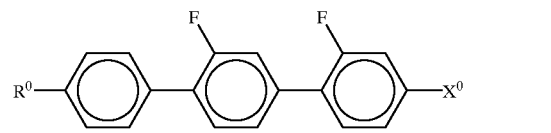

wherein $X^0$ is F or Cl, in particular F.

Preferred compounds of formula XVIII are those wherein $Y^1$ is F and $X^0$ is F or Cl, in particular F.

The liquid crystal mixture preferably comprises in addition one or more compounds selected from the formulae XX to XXIII.

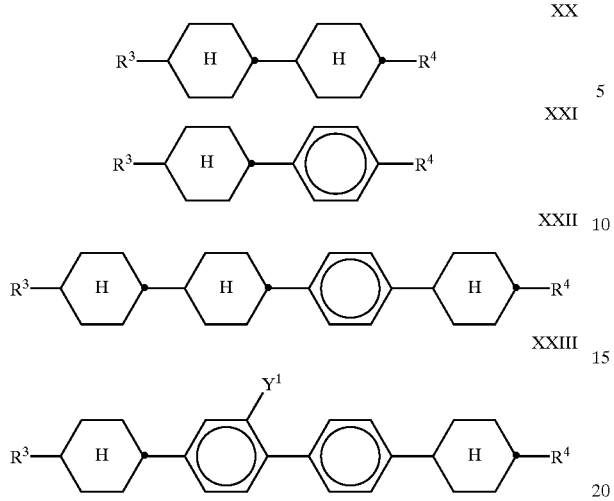

wherein $R^3$ and $R^4$ have independently of each other one of the meanings of $R^0$ as defined above and $Y^1$ is H or F.

In the compounds of formula XX $R^3$ and $R^4$ are preferably alkyl with 1 to 8 C atoms or alkenyl with 2 to 7 C atoms.

In the compounds of formula XXI, XXII and XXIII $R^3$ and $R^4$ are preferably alkyl or alkoxy with 1 to 8 C atoms.

Compounds of the formula XXIII, wherein $Y^1$ is F, are especially preferred.

The invention furthermore relates to an electrooptical display, preferably a display having active matrix addressing and/or a reflective display. The inventive display is preferably based on the OCB effect, a projection display and/or an LCoS™ display, characterized in that it contains, as a dielectric, a liquid-crystalline medium as described above.

Preferably the mixture essentially comprises compounds selected from the group comprising the generic formulae I, IIa, IIb and III to XXIII.

Preferred embodiments of the the present invention relate to mixtures that contain:

- at least 2%, preferably at least 3%, most preferably at least 4%, and preferably up to 20%, most preferably up to 15% by weight of one or more compounds of the formula I.
- at least 10%, preferably at least 15%, and preferably up to 45%, most preferably up to 40% by weight of one or more compounds of the formula IIa.
- at least 3%, preferably at least 5%, and preferably up to 40%, most preferably up to 30% by weight of one or more compounds of the formula IIb.
- at least 10%, preferably at least 15%, and preferably up to 75%, most preferably up to 60% by weight of one or more compounds of the formulae IV,
  - in particular at least 8%, preferably at least 15%, and preferably up to 50%, most preferably up to 40% by weight of one or more compounds of the formulae IVb and/or IVc, and
  - in particular at least 1%, preferably at least 3%, and preferably up to 20%, most preferably up to 15% by weight of one or more compounds of the formula IVa.
- at least one compound of formula Ia and/or Ib.
- at least one compound of formula IIa, in particular wherein $X^0$ is F, especially wherein $R^0$ is alkyl with 1 to 8 C-atoms.
- at least one compound of formula IIb, in particular wherein $X^0$ is Cl, especially wherein $R^0$ is alkyl with 1 to 8 C-atoms.
- at least one compound of formula IVb and/or IVc, in particular wherein $X^0$ is F, especially wherein $R^0$ is alkyl with 1 to 8 C-atoms.
- at least one compound of formula IVa, in particular wherein $X^0$ is F, especially wherein $R^0$ is alkyl with 1 to 8 C-atoms.
- at least one compound of formula IIIa1, in particular wherein alkenyl is vinyl.
- at least one compound of formula IXa, in particular wherein $X^0$ is F.
- one or more compounds of formula XVII1a, in particular wherein $X^0$ is F, $OCF_3$ or $OCHF_2$.
- at least one compound of formula XXIII, in particular wherein $Y^1$ is F.

The compounds of formula IIa, IIb, and III to XXIII are known from prior art or can be prepared according to known methods.

By using compounds of formula I it is possible to obtain inventive highly polar liquid crystalline mixtures with at the same time high birefringence and high clearing point. In addition, the use of compounds of formula IIa leads to high values of the dielectrical anisotropy in the inventive mixtures. Furthermore, liquid crystal mixtures according to the invention, comprising compounds of formula IIb, exhibit a very high birefringence.

The liquid-crystal mixture preferably has a nematic phase range of at least 75 K, in particular at least 90 K, and a clearing point above 70° C., in particular above 80° C., especially above 90° C.

The dielectric anisotropy is preferably greater than +8, very preferably at least +10, most preferably equal or greater than +11.

The mixtures according to the present invention usually are based on medium polar components having the indicated core structure and other non-cyano components. Of course, however, such mixtures can also additionally contain known cyano liquid crystalline components, preferably compounds of the formula XXIV

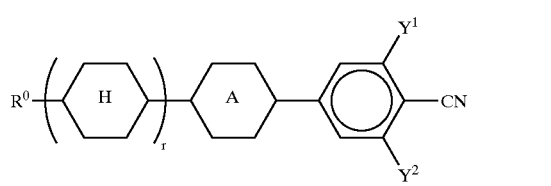

wherein $R^0$, r, $Y^1$ and $Y^2$ have the meanings given above, and

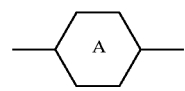

is trans-1,4-cyclohexylene or 1,4-phenylene, if extremely high values for the holding ratio (HR) are not needed, e.g. for TN or STN-use. The resulting mixtures are important for achieving very broad nematic phase ranges including very low temperatures (outdoor use).

The mixtures are preferably based on halogenated components of medium polarity and/or are essentially free of cyano components.

The liquid crystal mixtures according to the present invention are also suitable as liquid crystal media for use in cholesteric liquid crystal displays, in particular in SSCT ("surface stabilized cholesteric texture") and PSCT- ("polymer stabilized cholesteric texture") displays, as described for example in WO 92/19695, U.S. Pat. Nos. 5,384,067, 5,453,863, 6,172,720 or 5,661,533. Cholesteric liquid crystal displays typically comprise a cholesteric liquid crystal medium consisting of a nematic component and an optically active component and, compared to TN- and STN displays, exhibit a significantly higher helical twist and show selective reflection of circular polarised light. The reflection wavelength is given by the product of the pitch of the cholesteric helix and the mean refractive index of the cholesteric liquid crystal medium.

For this purpose one or more chiral dopants are added to the liquid crystal mixture according to the present invention, wherein the twisting power and concentration of the dopants are selected such that the resulting liquid crystal medium has a cholesteric phase at room temperature and a reflection wavelength that lies preferably within the visible, UV or IR range of the electromagnetic spectrum, in particular within the range from 400 to 800 nm. Suitable chiral dopants are known to the expert and commercially available, like for example cholesteryl nonanoate (CN), CB15, R/S-811, R/S-1011, R/S-2011, R/S-3011 or R/S-4011 (Merck KGaA, Darmstadt). Particularly suitable are dopants with high twisting power comprising a chiral sugar group, in particular sorbitol derivatives as disclosed in WO 98/00428. In case two or more dopants are used, they can exhibit the same or opposite twist sense and the same or opposite sign of the linear temperature coefficient of the twist.

In the components of the formulae IIa, IIb and III to XXIV $R^0$, $R^1$, $R^3$, and $R^4$ are preferably a straight-chained alkyl radical of 1 to 8 carbon atoms or is straight-chained methoxy alkyl. Preferred alkyl groups are methyl, ethyl, propyl, butyl, pentyl, hexyl, heptyl and octyl, in particular ethyl, propyl, butyl and pentyl. Preferred methoxy alkyl groups are methoxymethyl, methoxyethyl, methoxypropyl, methoxybutyl, methoxypentyl, methoxyhexyl, methoxyheptyl.

The term "alkoxy" comprises straight chain and branched alkoxy groups with 1 to 8 C atoms. Straight chain alkoxy groups are preferred. Thus, preferred alkoxy groups are methoxy, ethoxy, propoxy, butoxy, pentoxy, hexoxy, heptoxy and octoxy.

The term "alkenyl" comprises straight chain and branched alkenyl groups with 2 to 7 C atoms. Straight chain alkenyl groups are preferred. Further preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Of these, especially preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Alkenyl groups with up to 5 C atoms are particularly preferred.

In the foregoing and in the following those compounds containing at least one cyclohexane ring are preferred wherein the cyclohexane ring is trans-substituted.

The preparation of the mixtures according to the invention is effected in the conventional manner. In general, the desired amount of the components which is used in the smaller amount is dissolved in the components which constitutes the main constituent, preferably at elevated temperature. If this temperature is chosen to be above the clearing point of the main constituent, the completeness of the process of dissolving can be observed particularly easily.

However, it is also possible to mix solutions of the components in a suitable organic solvent, for example acetone, chloroform or methanol, and to remove the solvent, e.g. by distillation.

By means of suitable additives the liquid crystal phases according to the invention can be modified in such a way that they can be used in any hitherto disclosed kind of MLC display.

In the present application and in the examples below, the structures of the liquid-crystal compounds are indicated by means of acronyms, the transformation into chemical formulae taking place in accordance with Tables A and B below. All radicals $C_nH_{2n+1}$, $C_mH_{2m+1}$ and $C_rH_{2r+1}$ are straight-chain alkyl radicals and —$C_sH_{2s}$— is a straight-chain alkylen group having n, m, r and s carbon atoms respectively. n, m, r and s are integers and are independently of each other preferably 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$ as follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| $nOCCF_2$.F.F | $C_nH_{2n+1}$ | $OCH_2CF_2H$ | F | F |

Preferred mixture components are found in Tables A and B.

TABLE A

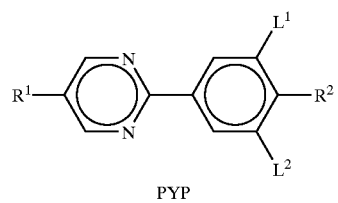

PYP

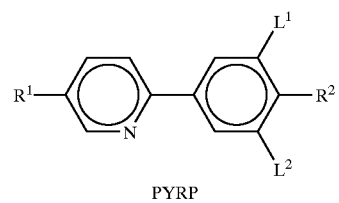

PYRP

TABLE A-continued
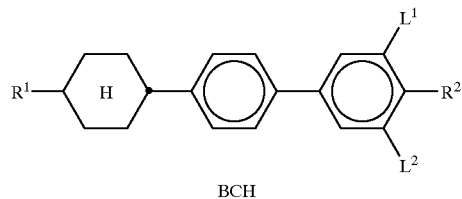
BCH
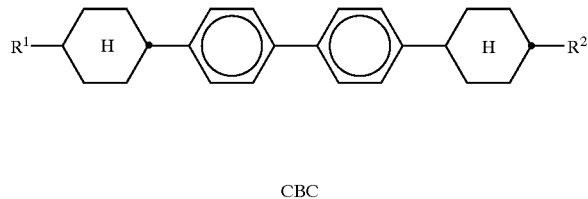
CBC
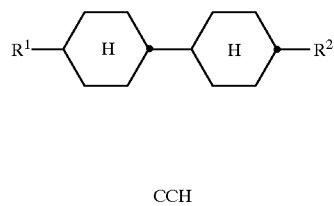
CCH
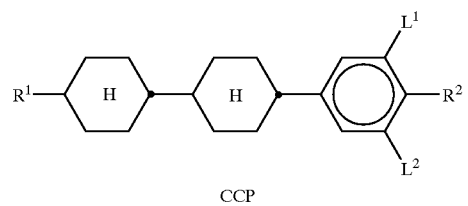
CCP
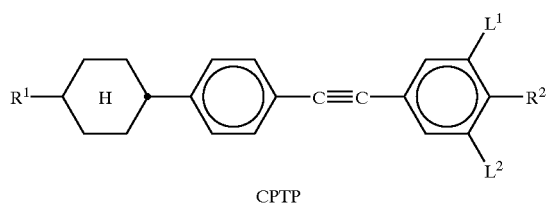
CPTP
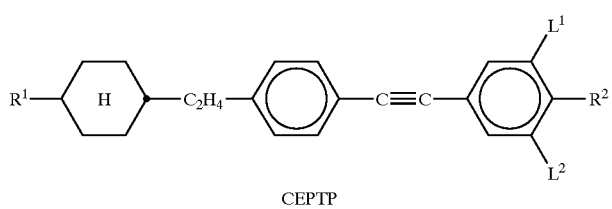
CEPTP
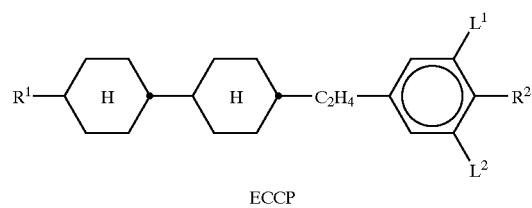
ECCP
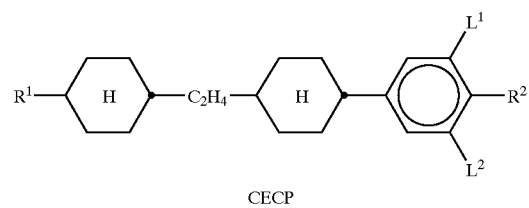
CECP
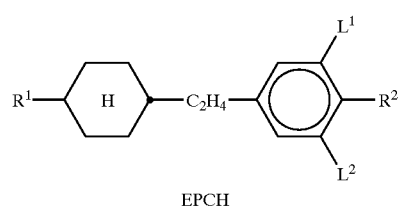
EPCH
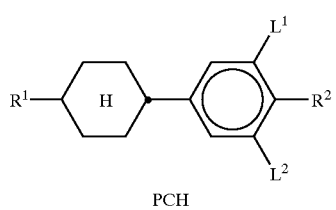
PCH
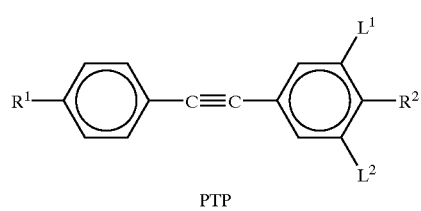
PTP
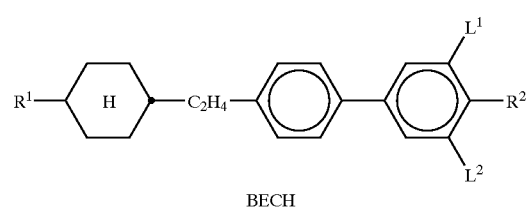
BECH TABLE A-continued
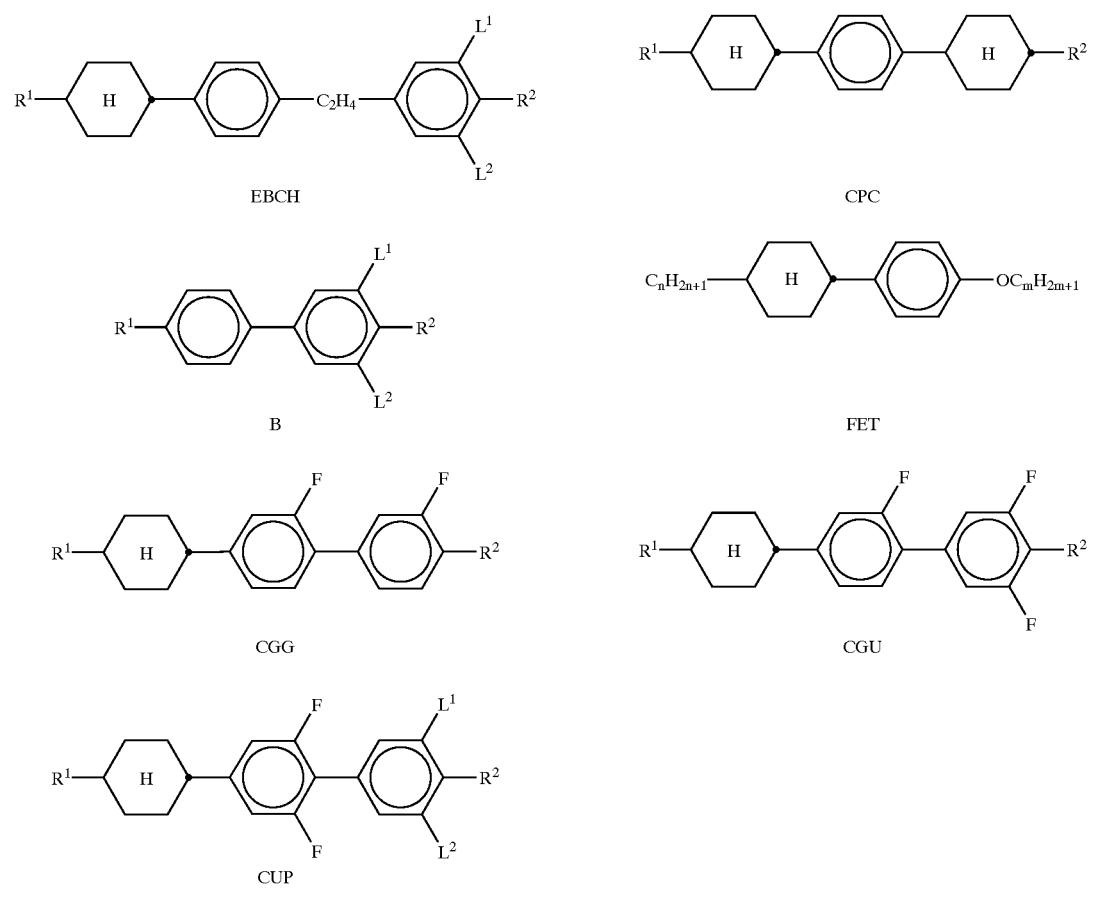
TABLE B
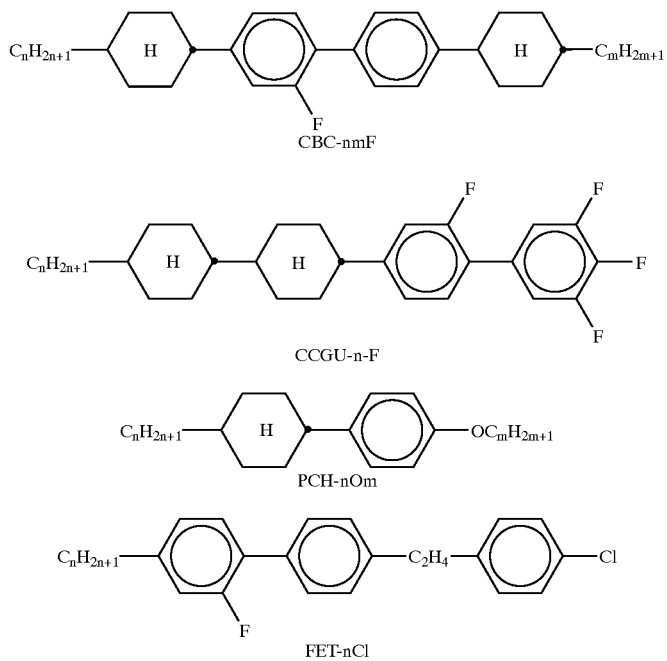

TABLE B-continued
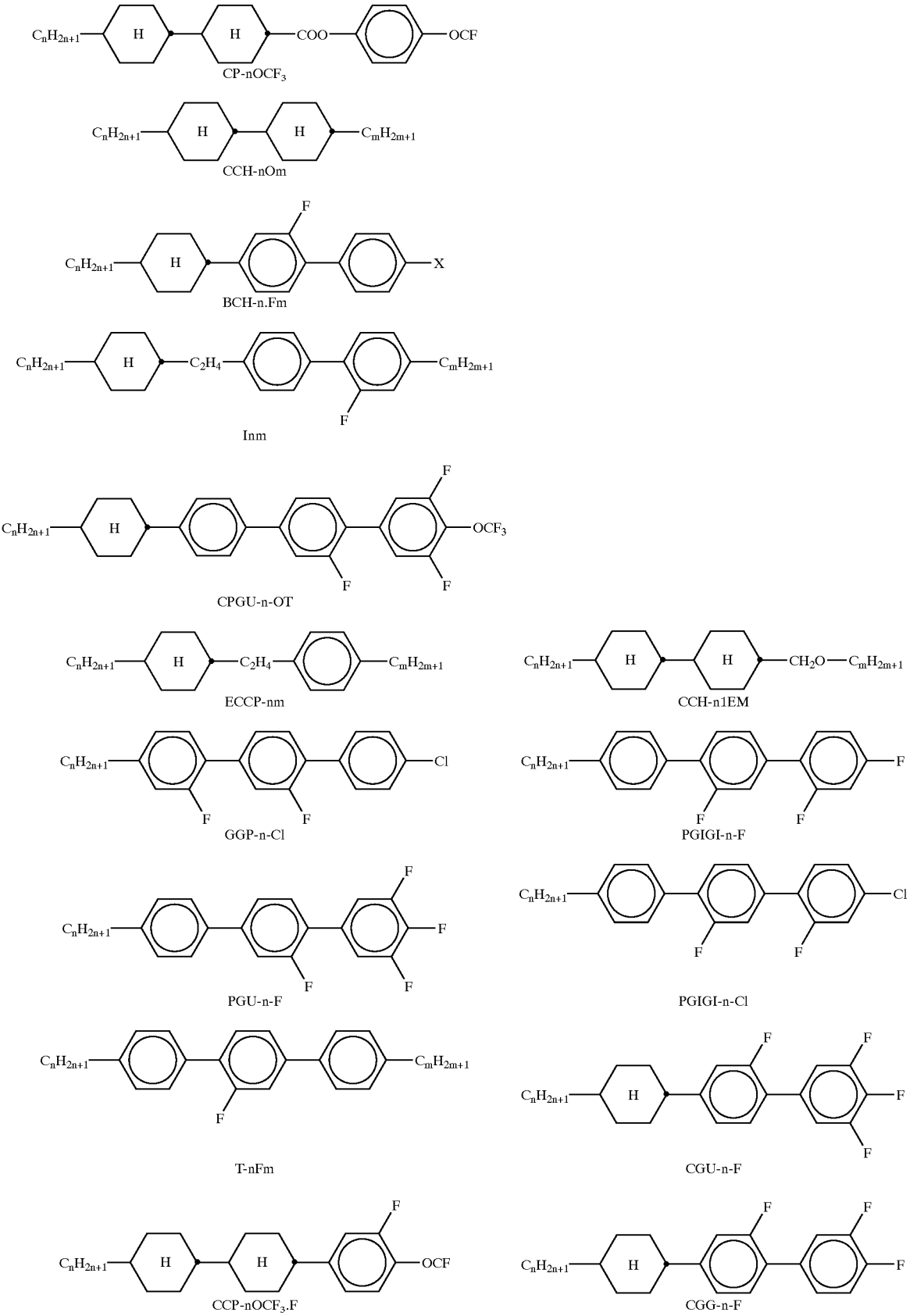

TABLE B-continued
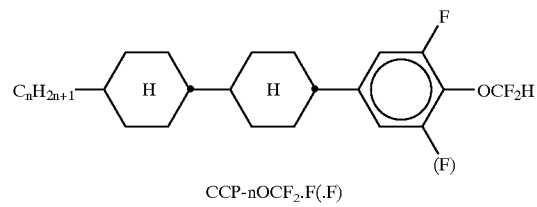
CCP-nOCF₂.F(.F)
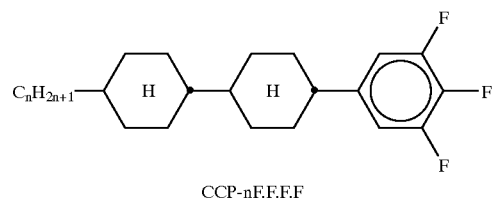
CCP-nF.F.F.F
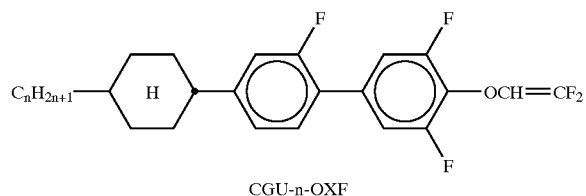
CGU-n-OXF
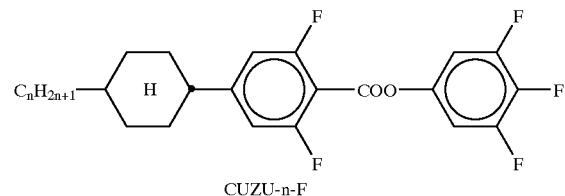
CUZU-n-F
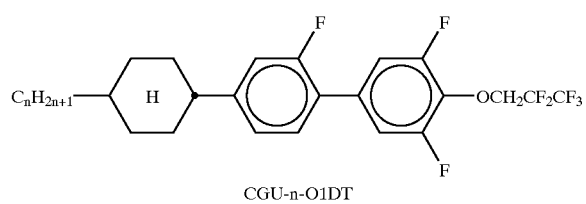
CGU-n-O1DT
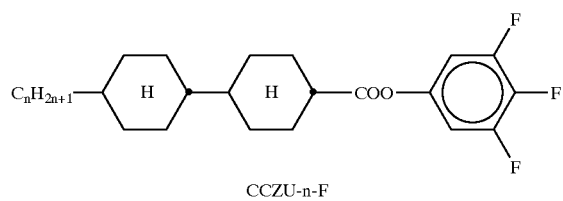
CCZU-n-F
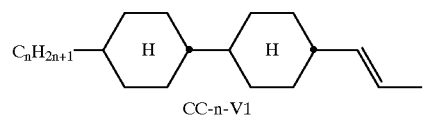
CC-n-V1
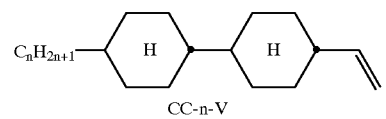
CC-n-V
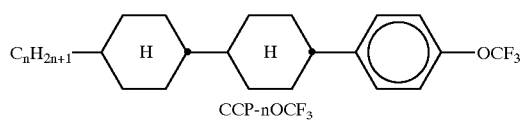
CCP-nOCF₃
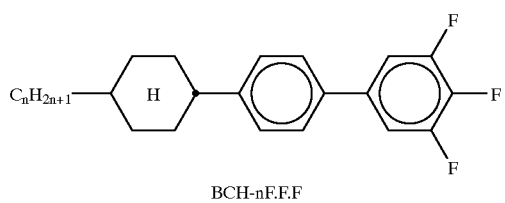
BCH-nF.F.F
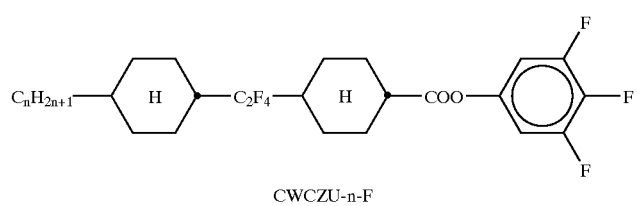
CWCZU-n-F TABLE B-continued
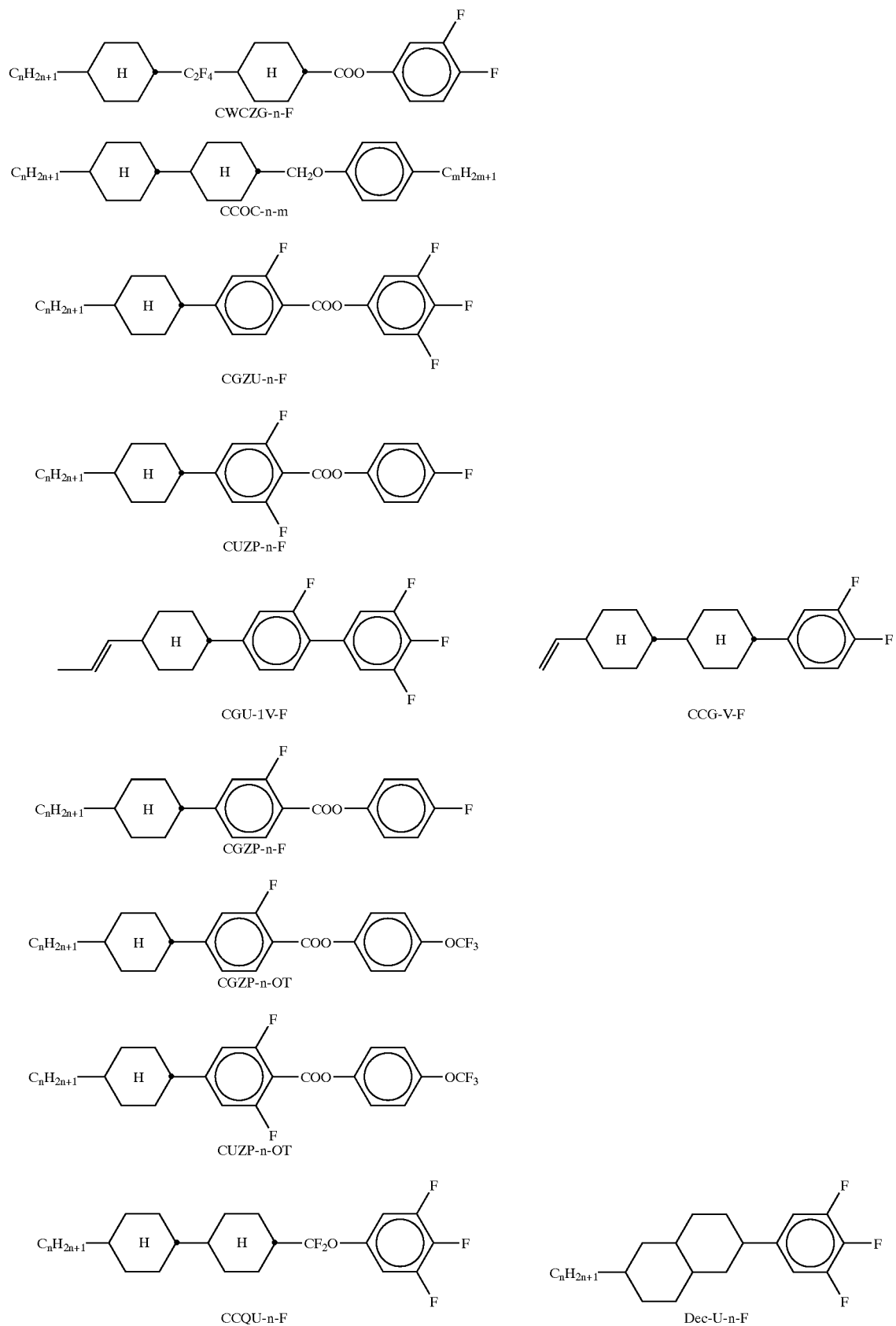

TABLE B-continued
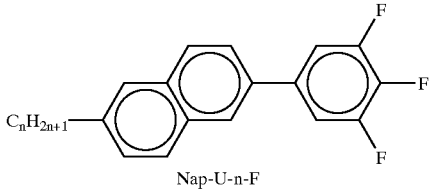
Nap-U-n-F
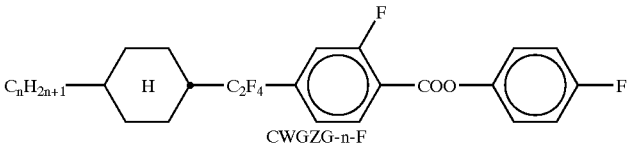
CWGZG-n-F
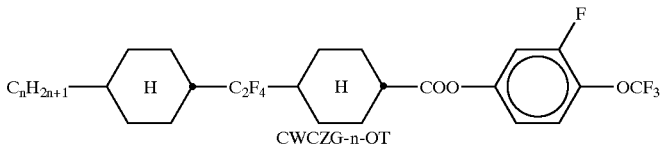
CWCZG-n-OT
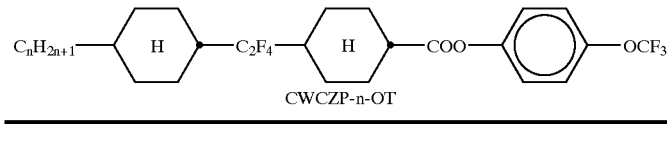
CWCZP-n-OT
TABLE C
Suitable dopants are listed in table C. One or more of these are generally added to the liquid crystalline medium according to the invention.
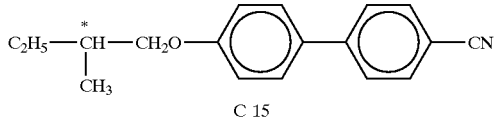
C 15
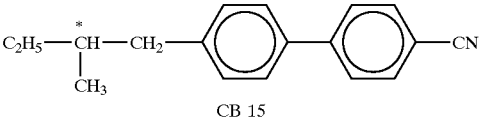
CB 15
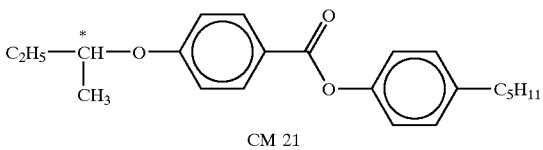
CM 21
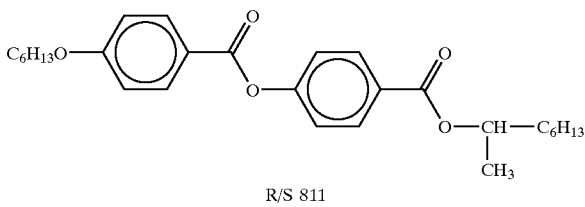
R/S 811
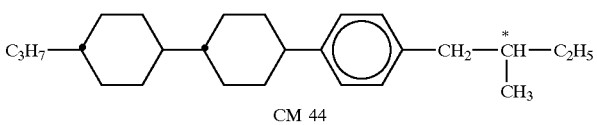
CM 44
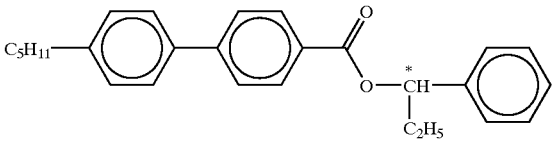
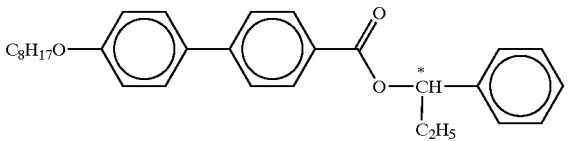

TABLE C-continued
Suitable dopants are listed in table C. One or more of these are generally added to the liquid crystalline medium according to the invention.
CM 45
CM 47
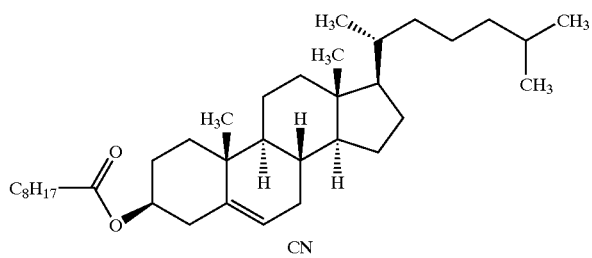
CN
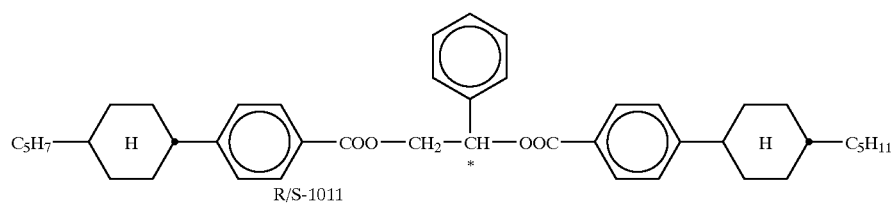
R/S-1011
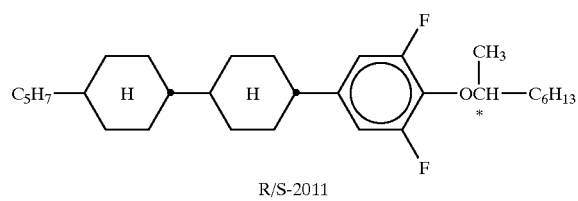
R/S-2011
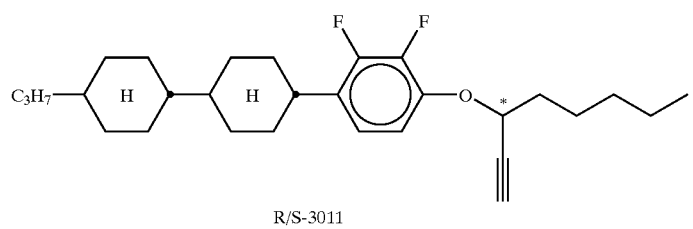
R/S-3011
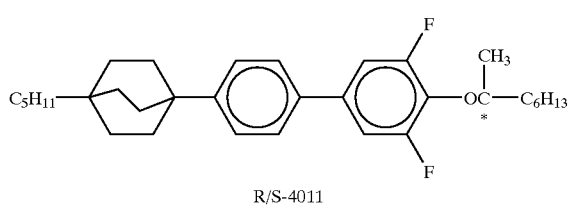
R/S-4011
TABLE D
Examples of stabilizers, which may be added to the liquid crystalline mixtures according to the invention, are listed below.
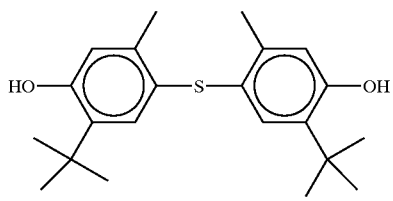 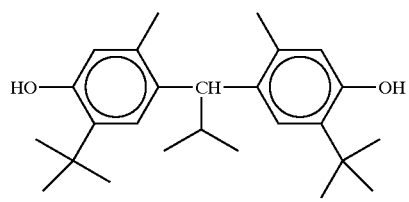

TABLE D-continued
Examples of stabilizers, which may be added to the liquid crystalline mixtures according to the invention, are listed below.
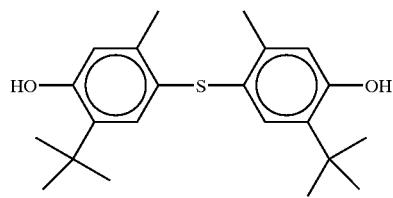
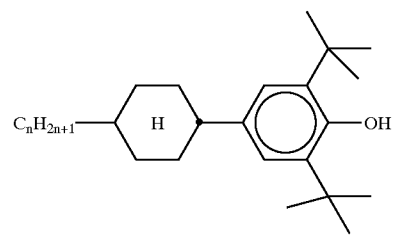
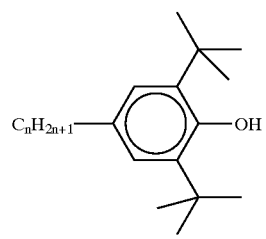
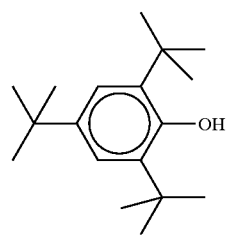
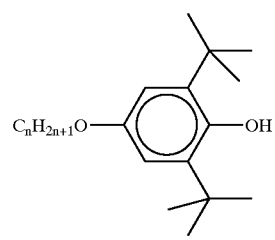
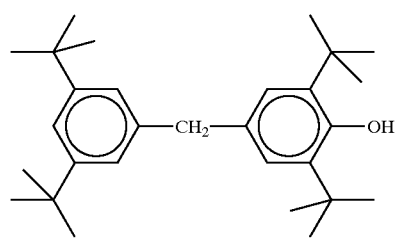
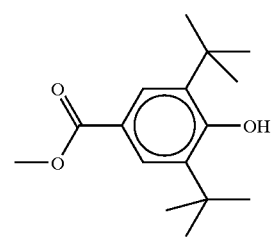
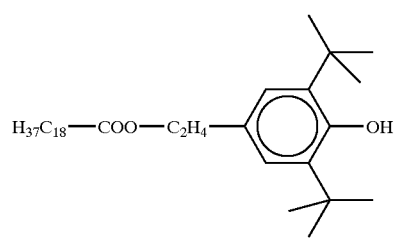
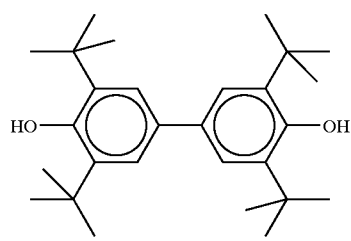
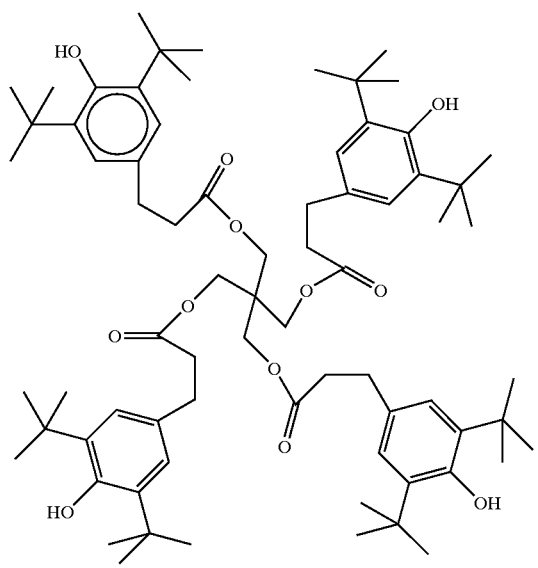

TABLE D-continued
Examples of stabilizers, which may be added to the liquid crystalline mixtures according to the invention, are listed below.
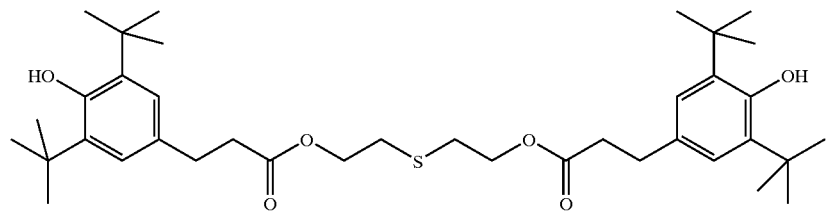
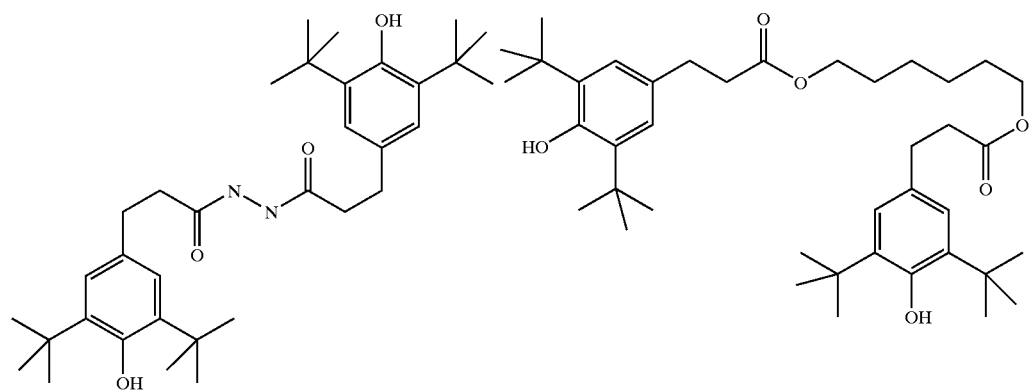
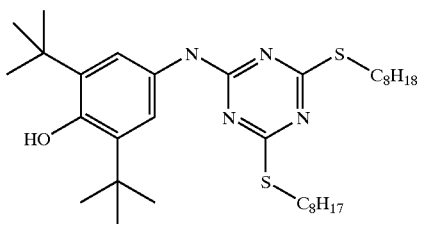
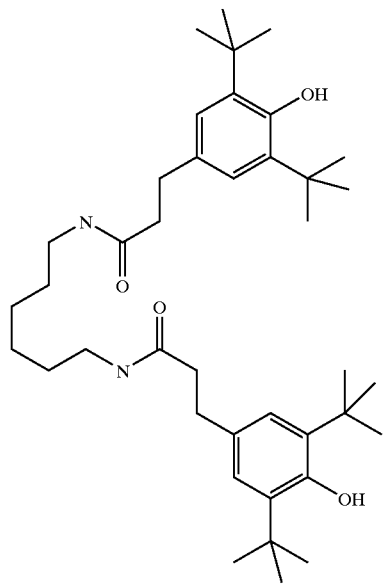

TABLE D-continued
Examples of stabilizers, which may be added to the liquid crystalline mixtures according to the invention, are listed below.
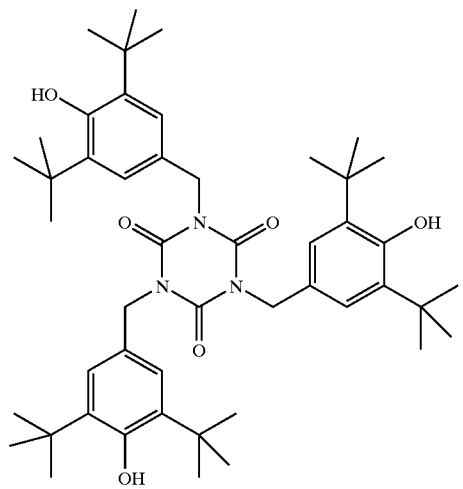
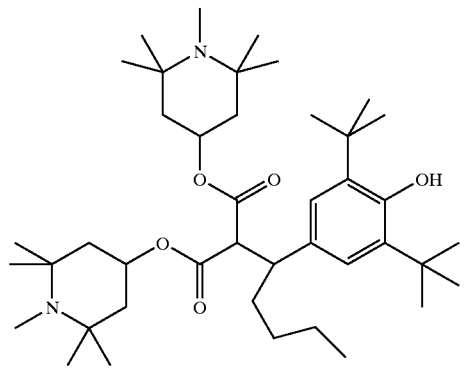
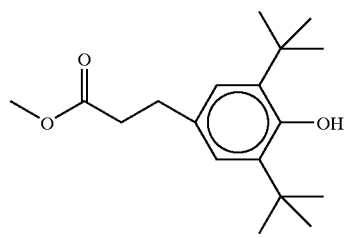
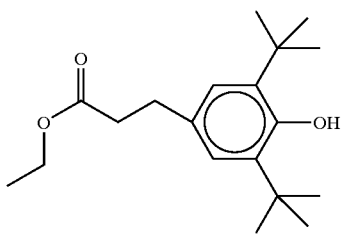
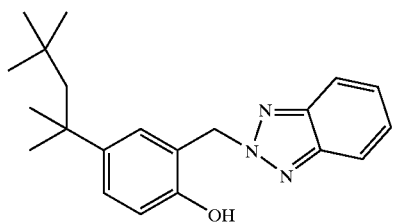
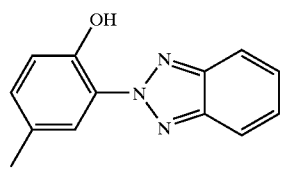
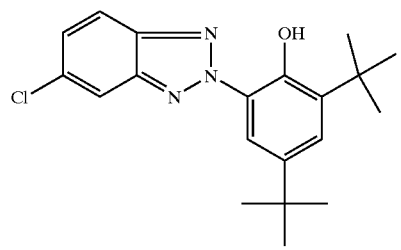
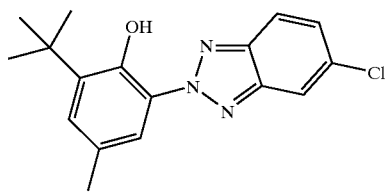

TABLE D-continued
Examples of stabilizers, which may be added to the liquid crystalline mixtures according to the invention, are listed below.
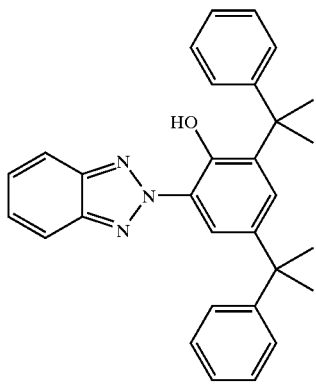
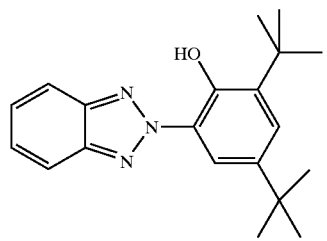
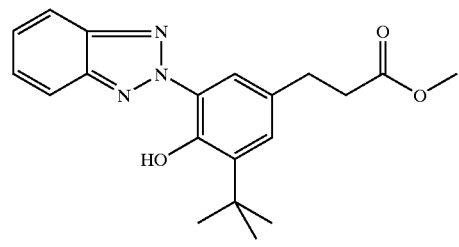
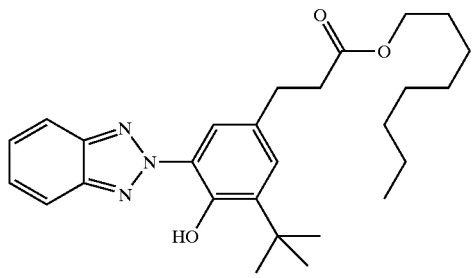
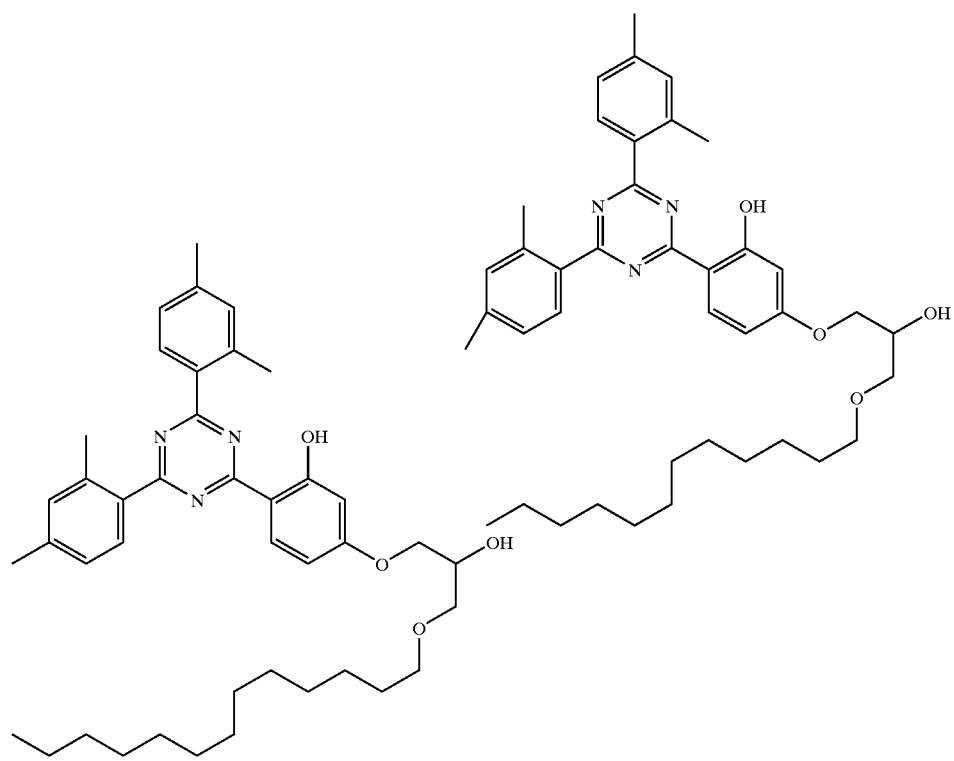

TABLE D-continued

Examples of stabilizers, which may be added to the liquid crystalline mixtures according to the invention, are listed below.

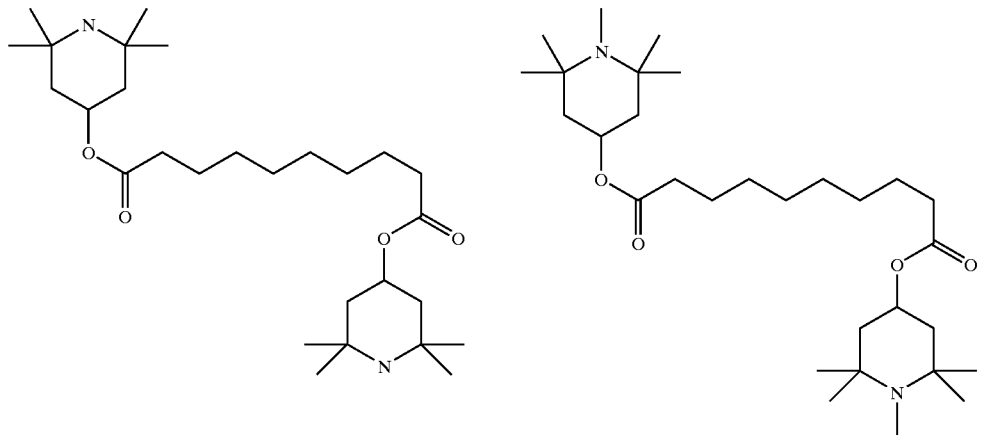

Particular preference is given to mixtures according to the invention which, besides one or more compounds of the formula 1, comprise two, three or more compounds selected from Table B.

The following abbreviations are used $\Delta n$ denotes the optical anisotropy measured at 20° C. and 589 nm $n_e$ denotes the extraordinary refractive index at 20° C. and 589 nm $\Delta\epsilon$ denotes the dielectric anisotropy at 20° C.

$\epsilon_{\parallel}$ denotes the dielectric constant in the parallel direction to the molecular axis cp denotes the clearing point [° C.]

$\gamma_1$ denotes the rotational viscosity [mPa s]

$V_0$ Fredericksz threshold [V]

THF tetrahydrofurane

MTB tert.-butyl-methyl-ether

C=crystalline state, N=nematic phase, Sm=smectic phase and I=isotropic phase. The data between these symbols are the transition temperatures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLE 1

Synthesis of CPGU-3-OT 1.1 Synthesis of the Boronic Acid (3)

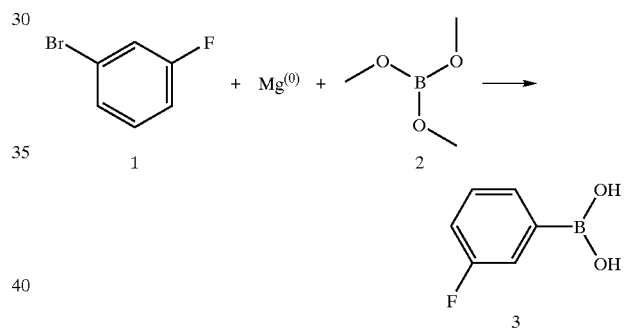

1.375 mol Mg in 100 ml THF are reacted with 1.25 mol 1-brom-3-fluorobenzene (1) in 350 ml THF under the conditions of a Grignard reaction at boiling heat. After the addition of the fluorobenzene, the reaction mixture is refluxed for 30 min. Afterwards 1.375 mol trimethylborate (2) in 300 ml THF are added to the reaction mixture dropwise. After one hour 500 ml MTB are added and then 200 ml concentrated HCl are added dropwise at a maximum of 20° C., while cooling. The following work up is conventional.

1.2 Synthesis of 3-Fluoro-4'-(trans-4-propyl-cyclohexyl)-biphenyl (5)

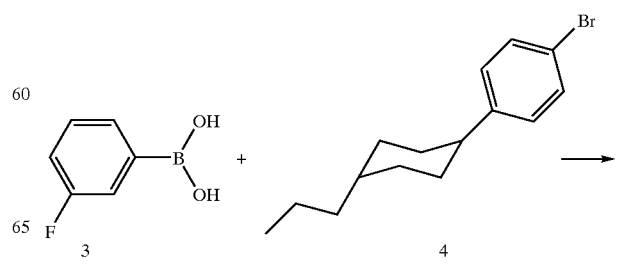

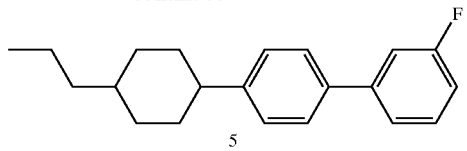

5

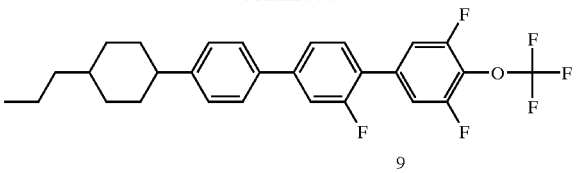

9

0.004 mol bis(triphenylphosphin)-palladium(II)-chloride and 0.004 mol hydraziniumhydroxide are added to 0.100 mol sodium metaborat-octahydrate in 80 ml water. To this mixture 0.200 mol 1-bromo-4-(trans-4-propyl-cyclohexyl)benzene (4) in 150 ml THf are added dropwise. After stirring for 5 min, 0.200 mol of the boronic acid (3) in 50 ml THF are added dropwise. The reaction mixture is refluxed for 10 hours, cooled to room temperature (20° C.) and worked up conventionally.

1.3 Synthesis of the Boronic Acid (7)

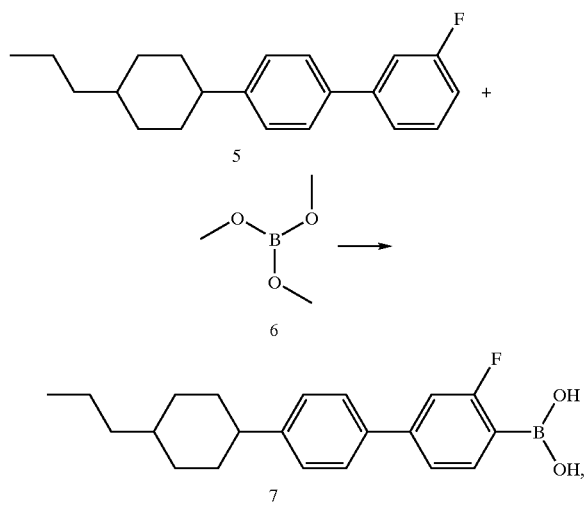

0.093 mol of the compound 5 in 60 ml THF are added to 0.093 mol potassium-tert-butylate in 100 ml THF at −80° C. dropwise. Furthermore, at −80° C. 0.093 mol butyllithium (15% solution in n-hexane) are added dropwise. The reaction mixture is stirred for 20 min. Afterwards 0.093 mol trimethylborate in 60 ml THF is added dropwise. After allowing the reaction mixture to warm to room temperature (20° C.), 200 ml water are added and a pH of 2 is achieved with 40 ml half concentrated HCl, followed by a conventional work-up.

1.4 Synthesis of CPGU-3-OT (9)

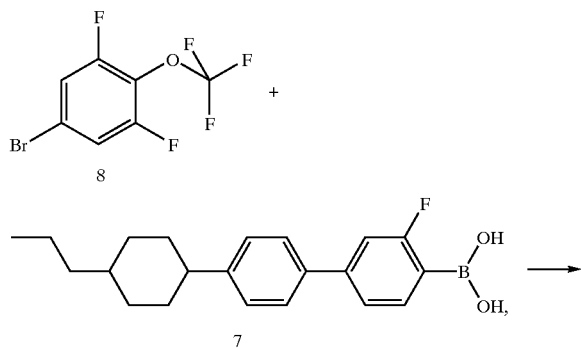

A solution of 0.040 mol $Na_2CO_3$ in 30 ml water is added to a mixture of 25 mmol of the bromide (8), 25 mmol of the boronic acid (7), 80 ml 2-propanole, 0.125 mmol palladium (II)acetate and 0.375 mmol triphenylphosphine. The reaction mixture is refluxed under stirring for 6–12 hours. After cooling to 20° C., the reaction mixture is poured onto 400 ml water. The precipitate is filtered by vaccuum and washed with cold water and ethanol. The resulting powder is recrystallized. A NMR and mass spectroscopy analysis yields the expected signals.

The following compounds are prepared by procedures similar to the previous example. Compounds where $X^1$ is Fn-OCHF$_2$ are comparative.

| $R^1$ | $X^1$ | |
|---|---|---|
| —CH$_3$ | —F | |
| —C$_2$H$_5$ | —F | K 120 N 197.5 I, $\Delta n$ = 0.2213, $\Delta \epsilon$ = 17.8, $\gamma_1$ = 414 mPa · s |
| —C$_3$H$_7$ | —F | K 113 N 223.8 I, $\Delta n$ = 0.2316, $\Delta \epsilon$ = 17.2, $\gamma_1$ = 790 mPa · s |
| —C$_4$H$_9$ | —F | K 108 N 215.1 I, $\Delta n$ = 0.2219, $\Delta \epsilon$ = 16.9, $\gamma_1$ = 659 mPa · s |
| —C$_5$H$_{11}$ | —F | |
| —C$_6$H$_{13}$ | —F | |
| —C$_7$H$_{15}$ | —F | |
| —CH$_3$ | —OCHF$_2$ | |
| —C$_2$H$_5$ | —OCHF$_2$ | K 106 N 228.0 I, $\Delta n$ = 0.2158, $\Delta \epsilon$ = 16.4, $\gamma_1$ = 640 mPa · s |
| —C$_3$H$_7$ | —OCHF$_2$ | |
| —C$_4$H$_9$ | —OCHF$_2$ | K 54 SmA 62 N 247.5 I, $\Delta n$ = 0.2109, $\Delta \epsilon$ = 15.5, $\gamma_1$ = 1,014 mPa · s |
| —C$_5$H$_{11}$ | —OCHF$_2$ | |
| —C$_6$H$_{13}$ | —OCHF$_2$ | |
| —C$_7$H$_{15}$ | —OCHF$_2$ | |
| —CH$_3$ | —OCF$_3$ | |
| —C$_2$H$_5$ | —OCF$_3$ | K 125 N 220.5 I, $\Delta n$ = 0.2090, $\Delta \epsilon$ = 21.9, $\gamma_1$ = 572 mPa · s |
| —C$_3$H$_7$ | —OCF$_3$ | K 94 N 240.0 I, $\Delta n$ = 0.2165, $\Delta \epsilon$ = 19.7, $\gamma_1$ = 802 mPa · s |
| —C$_4$H$_9$ | —OCF$_3$ | K 76 SmA (57.5) N 235.1 I, $\Delta n$ = 0.2092, $\Delta \epsilon$ = 20.4, $\gamma_1$ = 798 mPa · s |
| —C$_5$H$_{11}$ | —OCF$_3$ | |
| —C$_6$H$_{13}$ | —OCF$_3$ | |
| —C$_7$H$_{15}$ | —OCF$_3$ | |

EXAMPLE 2

A liquid crystal mixture is prepared that comprises

| | | | |
|---|---|---|---|
| PGIGI-3-F | 11.00% | cp | 101.0° C. |
| PGU-2-F | 10.00% | $n_e$ | 1.6912 |
| PGU-3-F | 10.00% | $\Delta n$ | 0.1809 |
| PGU-5-F | 9.00% | $\epsilon_{\parallel}$ | 19.1 |
| BCH-2F.F | 9.00% | $\Delta \epsilon$ | 14.5 |
| BCH-3F.F | 9.00% | $V_0$ | 0.95 V |
| BCH-5F.F | 9.00% | | |
| BCH-5F.F.F | 4.00% | | |
| CGU-3-F | 5.00% | | |
| CCGU-3-F | 9.00% | | |

-continued

| | | | |
|---|---|---|---|
| CBC-53F | 4.00% | | |
| CPGU-3-OT | 11.00% | | |

EXAMPLE 3

A liquid crystal mixture is prepared that comprises

| | | | | |
|---|---|---|---|---|
| PGIGI-3-F | 11.00% | cp | 99.0° C. | |
| PGU-2-F | 8.00% | $n_e$ | 1.6872 | |
| PGU-3-F | 10.00% | $\Delta n$ | 0.1763 | |
| PGU-5-F | 8.00% | | | |
| BCH-2F.F | 9.00% | | | |
| BCH-3F.F | 10.00% | | | |
| BCH-5F.F | 10.00% | | | |
| BCH-5F.F.F | 5.00% | | | |
| CGU-3-F | 6.00% | | | |
| CCGU-3-F | 10.00% | | | |
| CBC-53F | 3.00% | | | |
| CPGU-3-OT | 10.00% | | | |

EXAMPLE 4

A liquid crystal mixture is prepared that comprises

| | | | | |
|---|---|---|---|---|
| PGIGI-3-F | 11.00% | cp | 103.0° C. | |
| PGU-2-F | 10.00% | $n_e$ | 1.6930 | |
| PGU-3-F | 12.00% | $\Delta n$ | 0.1827 | |
| PGU-5-F | 9.00% | | | |
| BCH-2F.F | 7.00% | | | |
| BCH-3F.F | 8.00% | | | |
| BGH-5F.F | 8.00% | | | |
| BCH-5F.F.F | 11.00% | | | |
| CCGU-3-F | 10.00% | | | |
| CBC-53F | 2.00% | | | |
| CBC-33F | 3.00% | | | |
| CPGU-3-OT | 9.00% | | | |

EXAMPLE 5

A liquid crystal mixture is prepared that comprises

| | | | | |
|---|---|---|---|---|
| PGIGI-3-F | 11.00% | cp | 102.0° C. | |
| PGU-2-F | 10.00% | $n_e$ | 1.6941 | |
| PGU-3-F | 12.00% | $\Delta n$ | 0.1836 | |
| PGU-5-F | 9.00% | | | |
| BCH-2F.F | 8.00% | | | |
| BCH-3F.F | 8.00% | | | |
| BCH-5F.F | 9.00% | | | |
| BCH-5F.F.F | 4.00% | | | |
| CGU-3-F | 4.00% | | | |
| CCGU-3-F | 10.00% | | | |
| CBC-53F | 5.00% | | | |
| CPGU-3-OT | 10.00% | | | |

EXAMPLE 6

A liquid crystal mixture is prepared that comprises

| | | | |
|---|---|---|---|
| GGP-3-CL | 8.00% | cp | 102.0° C. |
| GGP-5-CL | 20.00% | $n_e$ | 1.7137 |

-continued

| | | | |
|---|---|---|---|
| PGIGI-3-F | 11.00% | $\Delta n$ | 0.1992 |
| BCH-3F.F | 5.00% | $\epsilon_\parallel$ | 16.7 |
| BCH-5F.F | 5.00% | $\Delta\epsilon$ | 12.0 |
| BCH-3F.F.F | 5.00% | $V_0$ | 1.13 V |
| BCH-5F.F.F | 5.00% | | |
| CCG-V-F | 12.00% | | |
| PGU-2-F | 8.00% | | |
| PGU-3-F | 11.00% | | |
| CBC-53F | 5.00% | | |
| CPGU-3-OT | 5.00% | | |

COMPARISON EXAMPLE

A liquid crystal mixture is prepared that comprises

| | | | |
|---|---|---|---|
| GGP-5-CL | 16.00% | cp | 102.0° C. |
| BCH-2F.F | 11.00% | $n_e$ | 1.6692 |
| BCH-3F.F | 11.00% | $\Delta n$ | 0.1610 |
| BCH-5F.F | 6.00% | $\epsilon_\parallel$ | 15.3 |
| CGU-2-F | 9.00% | $\Delta\epsilon$ | 10.9 |
| CGU-3-F | 9.00% | $V_0$ | 1.14 V |
| CGU-5-F | 8.00% | | |
| BCH-3F.F.F | 8.00% | | |
| CCGU-3-F | 7.00% | | |
| BCH-32 | 10.00% | | |
| CBC-33 | 3.00% | | |
| CBC-53 | 2.00% | | | and exhibits a significantly lower optical anisotropy than the mixtures of examples 1 to 5 comprising a compound of formula I (CPGU-n-OT).

The entire disclosures of all applications, patents and publications, cited herein and of corresponding European application No. 01126409.0, filed Nov. 7, 2001 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystalline compound of formula I

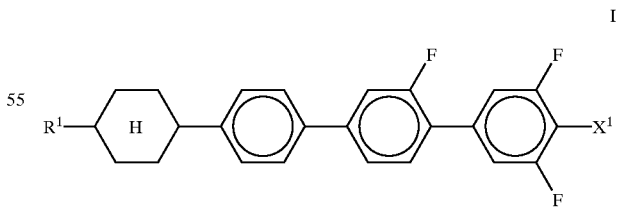

wherein $X^1$ is $OCF_3$ and $R^1$ is alkyl with 1 to 20 C atoms.

2. A liquid crystalline medium containing at least two liquid-crystalline compounds, at least one of which is a compound according to claim 1.

3. A liquid-crystalline medium based on a mixture of polar compounds of positive dielectric anisotropy, comprising at least one compound of formula I

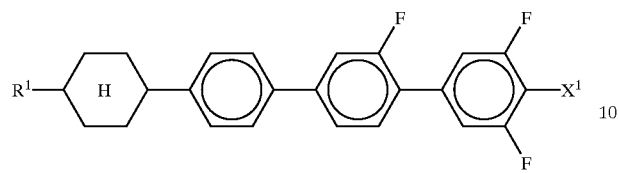

I wherein
$X^1$ is $OCF_3$ and
$R^1$ is alkyl with 1 to 20 C atoms.

4. A medium according to claim 3, having an optical anisotropy $\Delta n \geq 0.16$.

5. A medium according to claim 3 additionally comprising at least one compound of formula IIa

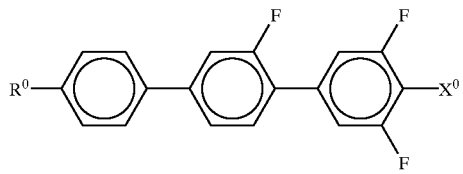

IIa wherein
$R^0$ is alkyl, alkoxy, fluoroalkyl, alkenyl or oxaalkenyl with up to 9 C atoms and
$X^0$ is F, Cl, $CF_3$, $OCF_3$, $OCHF_2$, fluoroalkyl or fluoroalkoxy with up to 7 carbon atoms.

6. A medium according to claim 3, additionally comprising at least one compound of formula IIb

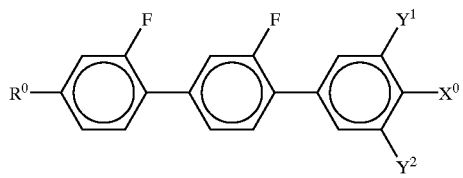

IIb wherein
$R^0$ is alkyl, alkoxy, fluoroalkyl, alkenyl or oxaalkenyl with up to 9 C atoms,
$X^0$ is F, Cl, $CF_3$, $OCF_3$, $OCHF_2$, fluoroalkyl or fluoroalkoxy with up to 7 carbon atoms, and
$Y^1$ and $Y^2$ are each independently H or F.

7. A medium according to claim 3, additionally comprising at least one compound of formula IV

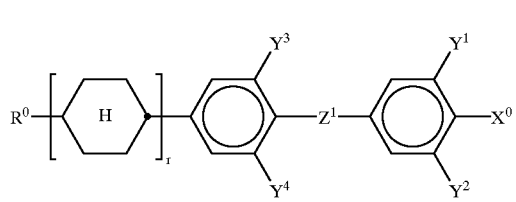

IV wherein
$R^0$ is alkyl, alkoxy, fluoroalkyl, alkenyl or oxaalkenyl with up to 9 C atoms,
$Z^1$ is $CF_2O$, $C_2F_4$ or a single bond,
$X^0$ is F, Cl, $CF_3$, $OCF_3$, $OCHF_2$, fluoroalkyl or fluoroalkoxy with up to 7 carbon atoms,
$Y^1$ to $Y^4$ are each independently H or F, and
r is 0 or 1.

8. A medium according to claim 3, additionally comprising at least one compound of formulae III, IX, XVII or XXIII

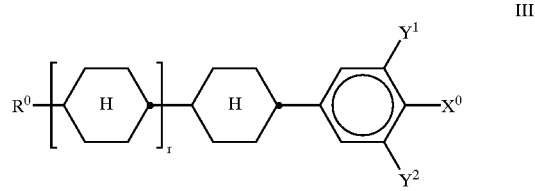

III

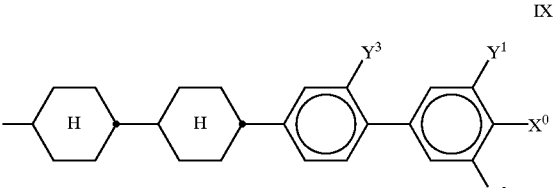

IX

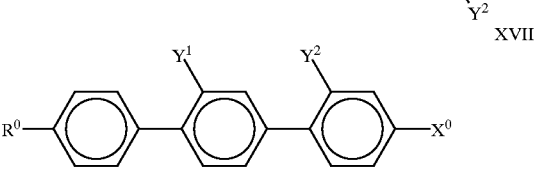

XVII

XXIII

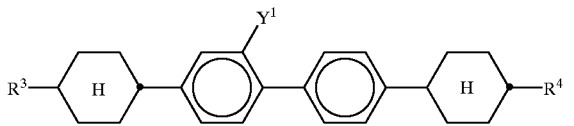

wherein
$R^0$, $R^3$, $R^4$ are independently of each other alkyl, alkoxy, fluoroalkyl, alkenyl or oxaalkenyl with up to 9 C atoms,
$X^0$ is F, Cl, $CF_3$, $OCF_3$, $OCHF_2$, fluoroalkyl or fluoroalkoxy with up to 7 carbon atoms,
$Y^1$ to $Y^3$ are each independently H or F, and
r is 0 or 1.

9. A medium according to claim 3, comprising 3 to 20% by weight of at least one compound of formula I.

10. A medium according to claim 5, comprising 10 to 40% by weight of at least one compound of formula IIa.

11. A medium according to claim 6, comprising 5 to 30% by weight of at least one compound of formula IIb.

12. A cholesteric liquid crystalline medium comprising a nematic component which is a liquid crystalline medium according to claim 3 and an optically active component which is at least one chiral dopant.

13. An electrooptical liquid-crystal display, comprising a liquid-crystalline medium according to claim 3.

14. An electrooptical liquid-crystal display according to claim 13, which is an active matrix display.

15. An electrooptical liquid-crystal display according to claim 13, which is a reflective display.

16. An electrooptical liquid-crystal display according to claim 13, which is a projection, LCoS™ or OCB mode display.

17. A cholesteric liquid crystal display comprising a cholesteric liquid crystalline medium according to claim 12.

18. A cholesteric liquid crystal display according to claim 17, which is a SSCT- or PSCT-display.

* * * * *